(12) United States Patent
Giladi

(10) Patent No.: US 12,335,535 B2
(45) Date of Patent: *Jun. 17, 2025

(54) PIXEL FILTERING FOR CONTENT

(71) Applicant: Comcast Cable Communications, LLC, Philadelphia, PA (US)

(72) Inventor: Alexander Giladi, Princeton, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/650,424

(22) Filed: Apr. 30, 2024

(65) Prior Publication Data

US 2024/0323448 A1    Sep. 26, 2024

Related U.S. Application Data

(63) Continuation of application No. 18/195,806, filed on May 10, 2023, now Pat. No. 12,003,782, which is a continuation of application No. 17/570,981, filed on Jan. 7, 2022, now Pat. No. 11,689,748, which is a continuation of application No. 16/676,849, filed on Nov. 7, 2019, now Pat. No. 11,252,440.

(51) Int. Cl.
*H04B 1/66* (2006.01)
*H04N 19/80* (2014.01)

(52) U.S. Cl.
CPC ................................... *H04N 19/80* (2014.11)

(58) Field of Classification Search
CPC ........ G06T 5/50; H04N 5/21; H04N 5/23277; H04N 5/23287; H04N 5/235; H04N 5/2352

USPC .......................................................... 375/240

See application file for complete search history.

(56) References Cited

U.S. PATENT DOCUMENTS

| | | | |
|---|---|---|---|
| 7,792,188 B2* | 9/2010 | Tong .................... | H04N 19/136 375/240 |
| 8,570,341 B1 | 10/2013 | Xie | |
| 8,830,360 B1* | 9/2014 | Burt ................... | H04N 23/6845 348/625 |
| 9,036,695 B2 | 5/2015 | Yang et al. | |
| 9,514,525 B2* | 12/2016 | Lim ....................... | G06T 5/002 |
| 2004/0218830 A1* | 11/2004 | Kang ................... | H04N 23/741 386/E5.069 |

(Continued)

FOREIGN PATENT DOCUMENTS

EP    1711019 A2    10/2006

OTHER PUBLICATIONS

John Canny, A Computational Approach to Edge Detection, IEEE, Nov. 1986.

(Continued)

*Primary Examiner* — Masum Billah
(74) *Attorney, Agent, or Firm* — Banner & Witcoff, Ltd.

(57) ABSTRACT

Systems, apparatuses, and methods are described for filtering and/or removing defects from content, such as high dynamic range (HDR) content. A plurality of parameters for filtering one or more pixels may be determined. The parameter(s) may be used to determine one or more filter weights, and the filter weight(s) may be applied to one or more pixels and one or more corresponding prior pixels to generate one or more filtered pixels. The filtered content and/or pixels thereof may later be encoded for storage and/or transmission to users.

48 Claims, 7 Drawing Sheets

(56) References Cited

U.S. PATENT DOCUMENTS

| | | | | |
|---|---|---|---|---|
| 2008/0137947 | A1* | 6/2008 | Sawada | H04N 23/843 348/E5.079 |
| 2012/0106639 | A1* | 5/2012 | Yang | H04N 19/117 375/E7.243 |
| 2012/0194537 | A1 | 8/2012 | Huang et al. | |
| 2014/0341287 | A1 | 11/2014 | Mody et al. | |
| 2016/0156367 | A1 | 6/2016 | Kalevo et al. | |

OTHER PUBLICATIONS

Scott Miller, A Perceptual EOTF for Extended Dynamic Range Imagery, smpte.org, 2014.

Eric Dubois and Shaker Sabri, Noise Reduction in Image Sequences Using Motion-Compensated Temporal Filtering, IEEE, Jul. 1984.

Sriram Sethuraman et al., Analysis of the emerging AOMedia AV1 video coding format for OTT usecases, www.ibc.org, Oct. 26, 2017.

Rachid Deriche, Using Canny's Criteria to Derive a Recursively Implemented Optimal Edge Detector, International Journal of Computer Vision, 167-187 (1987).

"Chromaticity." Wikipedia, Wikimedia Foundation, Updated Sep. 29, 2018, en.wikipedia.org/wiki/Chromaticity.

"CIELUV—Color Models—Technical Guides", Adobe Systems Incorporated, 2000.

"Color Difference." Wikipedia, Wikimedia Foundation, edited Oct. 5, 2017, en.wikipedia.org/wiki/Color_difference.

"Delta E: The Color Difference." ColorWiki—The Ins and Outs of GRACOL 7 and G7, Mar. 12, 2015, www.colorwiki.com/wiki/Delta_E:_The_Color_Difference.

"Edge Detection." Wikipedia, Wikimedia Foundation, Oct. 13, 2018, en.wikipedia.org/wiki/Edge_detection.

"H.264 Video Encoding Guide" FFmpeg, Oct. 13, 2018, trac.ffmpeg.org/wiki/Encode/H.264.

Leger, Henry St. "HDR TV: What Is HDR, and What Does High Dynamic Range Mean for Your TV?" TechRadar, TechRadar The Source for Tech Buying Advice, Dec. 7, 2018, www.techradar.com/news/television/hdr-welcome-to-the-next-big-shift-in-home-entertainment-1280990.

MulticoreWare Inc. "HEVC / H.265 Explained." x265, 2017, x265.org/hevc-h265/.

CIE International Commission on Illumination. "Colorimetry—Part 5: CIE 1976 L*u*v* Colour Space and u', v' Uniform Chromaticity Scale Diagram." International Organization for Standardization, Sep. 2, 2016, www.iso.org/standard/69034.html.

Schuessler, Zachary. "Delta E 101." updated Nov. 11, 2016, zschuessler.github.io/DeltaE/learn/.

"List of Color Spaces and Their Uses." Wikipedia, Wikimedia Foundation, updated Aug. 31, 2017, en.wikipedia.org/wiki/List_of_color_spaces_and_their_uses.

Tekalp, A. Murat. Digital Video Processing. Second ed., Prentice Hall, 2015, excerpt.

Recommendation ITU-R BT.601, "Studio encoding parameters of digital television for standard 4:3 and wide-screen 16:9 aspect ratios." International Telecommunication Union, Mar. 2011.

Recommendation ITU-R BT.709-6, "Parameter values for the HDTV standards for production and international programme exchange." International Telecommunication Union, Jun. 2015.

Recommendation ITU-R BT.2020-2, "Parameter values for ultra-high definition television systems for production and international programme exchange." International Telecommunication Union, Oct. 2015.

Recommendation ITU-R BT.2100-2, "Image parameter values for high dynamic range television for use in production and international programme exchange" International Telecommunication Union, Jul. 2018.

"Study Group Report High-Dynamic-Range (HDR) Imaging Ecosystem," Society of Motion Picture and Television Engineers, Sep. 19, 2015.

"The CIE Color Models", Adobe Systems Incorporated, 2000.

Sudhakaran, Sareesh. "Understanding MPEG-2, MPEG-4, H.264, AVCHD and H.265." Wolfcrow, Apr. 11, 2013, wolfcrow.com/blog/understanding-mpeg-2-mpeg-4-h-264-avchd-and-h-265/.

Fjelsted, Caitlin. "Understanding HDR—What the New Viewing Experience Means for Color Calibration." SpectraCal, Inc., May 2015.

"Definition of: YCbCr." PCMAG, www.pcmag.com/encyclopedia/term/55147/ycbcr, retrieved Oct. 11, 2017.

Liwei Guo et al: "Integration of Recursive Temporal LMMSE Denoising Filter Into Video Codec" IEEE Transactions on Circuits and Systems for Video Technology, Institute of Electrical and Electronics Engineers, US, vol. 20, No. 2, Feb. 2010.

Sullivan G J et al: "Meeting Report of 1-15 the 26th JCT-VC Meeting" 26. JCT-VC Meeting; Dec. 1, 2017-Jan. 20, 2017; Geneva; (Joint Collaborative Team on Video Coding of ISO/IEC JTC1/SC29/WG11 and ITU-T SG.16 ) Mar. 31, 2017.

Zaw Min Oo et al: "A low complexity 1-15 texture-discriminating noise removal method for video encoding" Industrial Electronics and Applications (ICIEA), 2010 The 5th IEEE Conference on, IEEE, Piscataway, NJ, USA, Jun. 15, 2010.

Apr. 12, 2021—European Search Report—EP 20206215.4.

* cited by examiner

PIXEL FILTERING FOR CONTENT

CROSS-REFERENCE TO RELATED APPLICATIONS

This application is a continuation of and claims priority to U.S. patent application Ser. No. 18/195,806, filed May 10, 2023, which is a continuation of U.S. patent application Ser. No. 17/570,981, filed Jan. 7, 2022 (now U.S. Pat. No. 11,689,748), which is a continuation of U.S. patent application Ser. No. 16/676,849, filed Nov. 7, 2019 (now U.S. Pat. No. 11,252,440), each of which is hereby incorporated by reference in its entirety.

BACKGROUND

Video content from content sources may include noise, and the noise may negatively affect the quality of the content. The noise may also negatively affect the encoding process for the content before transmission to viewers. Identifying and minimizing this noise will help improve content quality, transmission efficiency and the overall viewer experience. These and other shortcomings are identified and addressed by this disclosure.

SUMMARY

The following summary presents a simplified summary of certain features. The summary is not an extensive overview and is not intended to identify key or critical elements.

A color model may be variously configured. In one example, it may include a mathematical model that represents colors as tuples of numbers, typically as three or four values or color components. In examples, this model may be associated with a precise description of how the components are to be interpreted, for example based on human perception of color and/or perception of color under various viewing conditions. In these examples, the resulting set of colors may be referred to as color spaces.

In one aspect, systems, apparatuses, and methods are described for filtering one or more pixels of content, such as high dynamic range (HDR) content. Filtering pixels may be used to remove, for example, undesired noise or artifacts from the content and to increase compressibility. Image frames or pixels in the image frames may be converted to a different color space before the pixels are filtered. For example, pixels may be converted from a YCbCr color space to a Comission Internationale de l'Eclairage (CIE) 1976 L*u*v* color space. One or more parameters for filtering pixels may be determined, and the parameter(s) may be based on, for example, an intensity level of a region of pixels surrounding the pixel(s) to be filtered, a complexity level of a region of pixels surrounding the pixel(s) to be filtered, and/or other factors. The parameter(s) may be used to determine one or more filter weights, and the filter weights may be applied to one or more pixels in an image frame and one or more corresponding pixels in a prior image frame to determine filtered pixels. The filtered content and/or pixels thereof may be encoded and/or sent to users for viewing. By filtering pixels before encoding and/or sending to viewers, the compressibility of the content may be increased and/or noise present in the content may be removed.

These and other aspects, features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
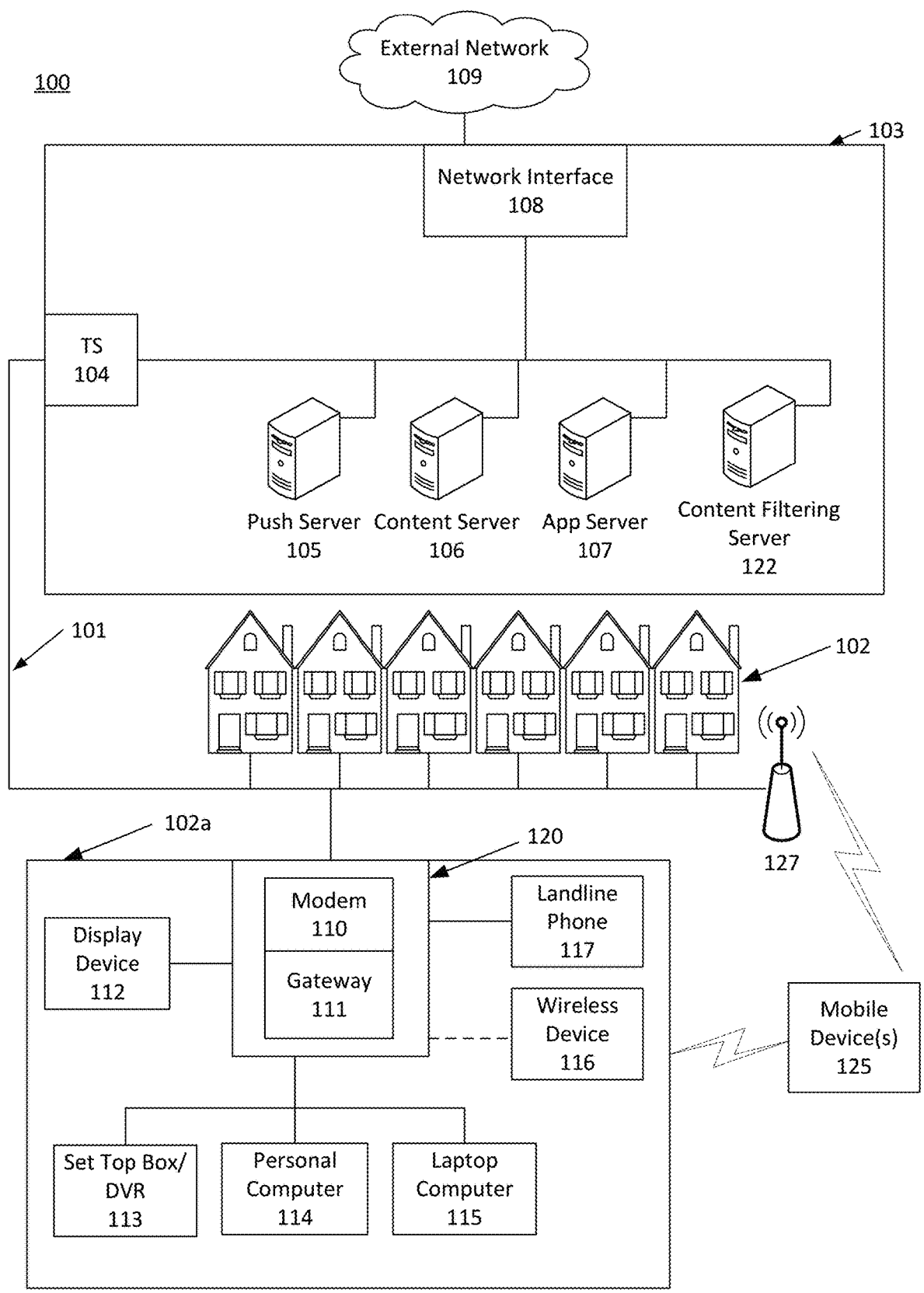
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may be any type of information distribution network, such as satellite, telephone, cellular, wireless, etc. Examples may include an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may transmit downstream information signals and receive upstream information signals via the communication links 101. Each of the premises 102 may have equipment, described below, to receive, send, and/or otherwise process those signals.

Communication links 101 may originate from the local office 103 and may be split to exchange information signals with the various premises 102. The communication links 101 may include components not illustrated, such as splitters, filters, amplifiers, etc. to help convey the signal clearly. The communication links 101 may be coupled to an access point 127 (e.g., a base station of a cellular network, a Wi-Fi access point, etc.) configured to provide wireless communication channels to communicate with one or more mobile devices 125. The mobile devices 125 may include cellular mobile devices, and the wireless communication channels may be Wi-Fi IEEE 802.11 channels, cellular channels (e.g., LTE), and/or satellite channels.

The local office 103 may include an interface 104, such as a termination system (TS). The interface 104 may be a cable modem termination system (CMTS), which may be a computing device configured to manage communications between devices on the network of the communication links 101 and backend devices such as servers 105-107 and 122. The interface 104 may be configured to place data on one or more downstream frequencies to be received by modems at the various premises 102, and to receive upstream communications from those modems on one or more upstream frequencies.

The local office 103 may also include one or more network interfaces 108 which may permit the local office 103 to communicate with various other external networks 109. The external networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the external networks. For example, the local office 103 may also or alternatively communicate with a cellular telephone network and its corresponding mobile devices 125 (e.g., cell phones, smartphone, tablets with cellular radios, laptops communicatively coupled to cellular radios, etc.) via the interface 108.

The push notification server 105 may generate push notifications to deliver data and/or commands to the various premises 102 in the network (or more specifically, to the devices in the premises 102 that are configured to detect such notifications). The content server 106 may be one or more computing devices that are configured to provide content to devices at premises. This content may be, for example, video on demand movies, television programs, songs, text listings, web pages, articles, news, images, files, etc. The content server 106 (or, alternatively, an authentication server) may include software to validate user identities and entitlements, to locate and retrieve requested content and to initiate delivery (e.g., streaming) of the content to the requesting user(s) and/or device(s). The application server 107 may be a computing device configured to offer any desired service, and may execute various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. The local office 103 may include additional servers, including a content filtering server 122 (described below), additional push, content, and/or application servers, and/or other types of servers. Although shown separately, the push server 105, the content server 106, the application server 107, the content filtering server 122, and/or other server(s) may be combined. The servers 105, 106, 107, and 122, and/or other servers, may be computing devices and may include memory storing data and also storing computer executable instructions that, when executed by one or more processors, cause the server(s) to perform steps described herein.

An example premise 102a may include an interface 120. The interface 120 may include any communication circuitry used to communicate via one or more of the links 101. The interface 120 may include a modem 110, which may include transmitters and receivers used to communicate via the links 101 with the local office 103. The modem 110 may be, for example, a coaxial cable modem (for coaxial cable lines of the communication links 101), a fiber interface node (for fiber optic lines of the communication links 101), twisted-pair telephone modem, cellular telephone transceiver, satellite transceiver, local Wi-Fi router or access point, or any other desired modem device. One modem is shown in FIG. 1, but a plurality of modems operating in parallel may be implemented within the interface 120. The interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway interface device 111 may comprise a modem, set-top box (STB), digital video recorder (DVR), a digital transport adapter (DTA), computer server, and/or any other desired computing device. The gateway interface device 111 may also include local network interfaces to provide communication signals to requesting entities/devices in the premises 102a, such as display devices 112 (e.g., televisions), additional STBs or DVRs 113, personal computers 114, laptop computers 115, wireless or wired streaming devices and connected televisions, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

One or more of the devices at a premise 102a may be configured to provide wireless communications channels (e.g., IEEE 802.11 channels) to communicate with a mobile device 125. A modem 110 (e.g., access point) or a wireless device 116 (e.g., router, tablet, laptop, etc.) may wirelessly communicate with one or more mobile devices 125, which may be on- or off-premises.

Mobile devices 125 may communicate with a local office 103 including, for example, with the content filtering server 122. Mobile devices 125 may be cell phones, smartphones, tablets (e.g., with cellular transceivers), laptops (e.g., communicatively coupled to cellular transceivers), wearable devices (e.g., smart watches, electronic eye-glasses, etc.), or any other mobile computing devices. Mobile devices 125 may store, output, and/or otherwise use assets. An asset may be a video, a game, one or more images, software, audio, text, webpage(s), and/or other content. Mobile devices 125 may include Wi-Fi transceivers, cellular transceivers, satellite transceivers, and/or global positioning system (GPS) components.

Figure 2:
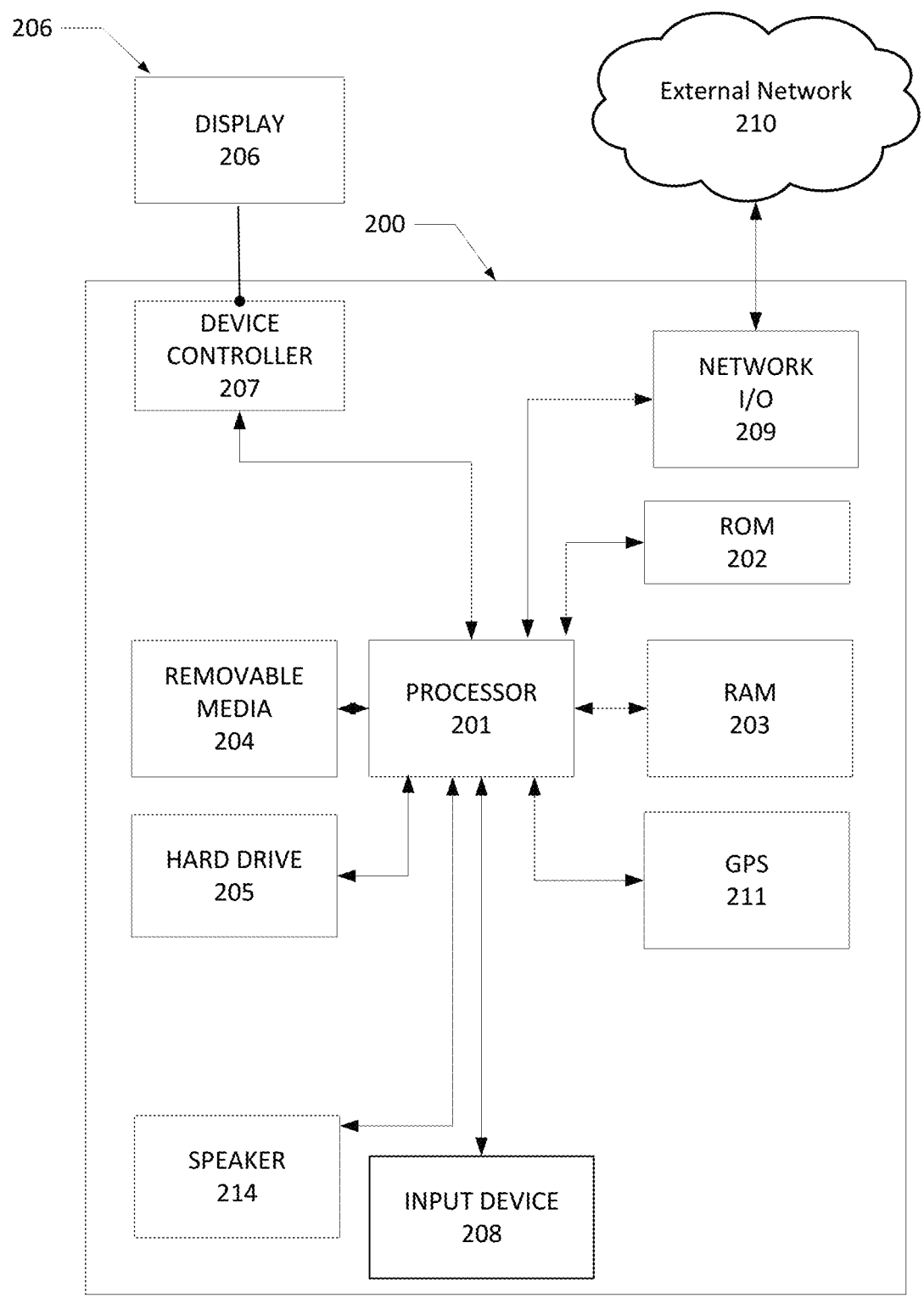
FIG. 2 shows hardware elements of a computing device.

FIG. 2 shows hardware elements of a computing device that may be used to implement any of the computing devices discussed herein (e.g., a content filtering server). The computing device 200 may include one or more processors 201, which may execute instructions of a computer program to perform any of the functions described herein. The instructions may be stored in a read-only memory (ROM) 202, random access memory (RAM) 203, removable media 204 (e.g., a Universal Serial Bus (USB) drive, a compact disk (CD), a digital versatile disk (DVD)), and/or in any other type of computer-readable medium or memory. Instructions may also be stored in an attached (or internal) hard drive 205 or other types of storage media. The computing device 200 may include one or more output devices, such as a display 206 (e.g., an external television or other display device), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. The network input/output circuit 209 may include a modem (e.g., a cable modem), and the external network 210 may include the communication links 101 discussed above, the external network 109, an in-home network, a network provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 4A:
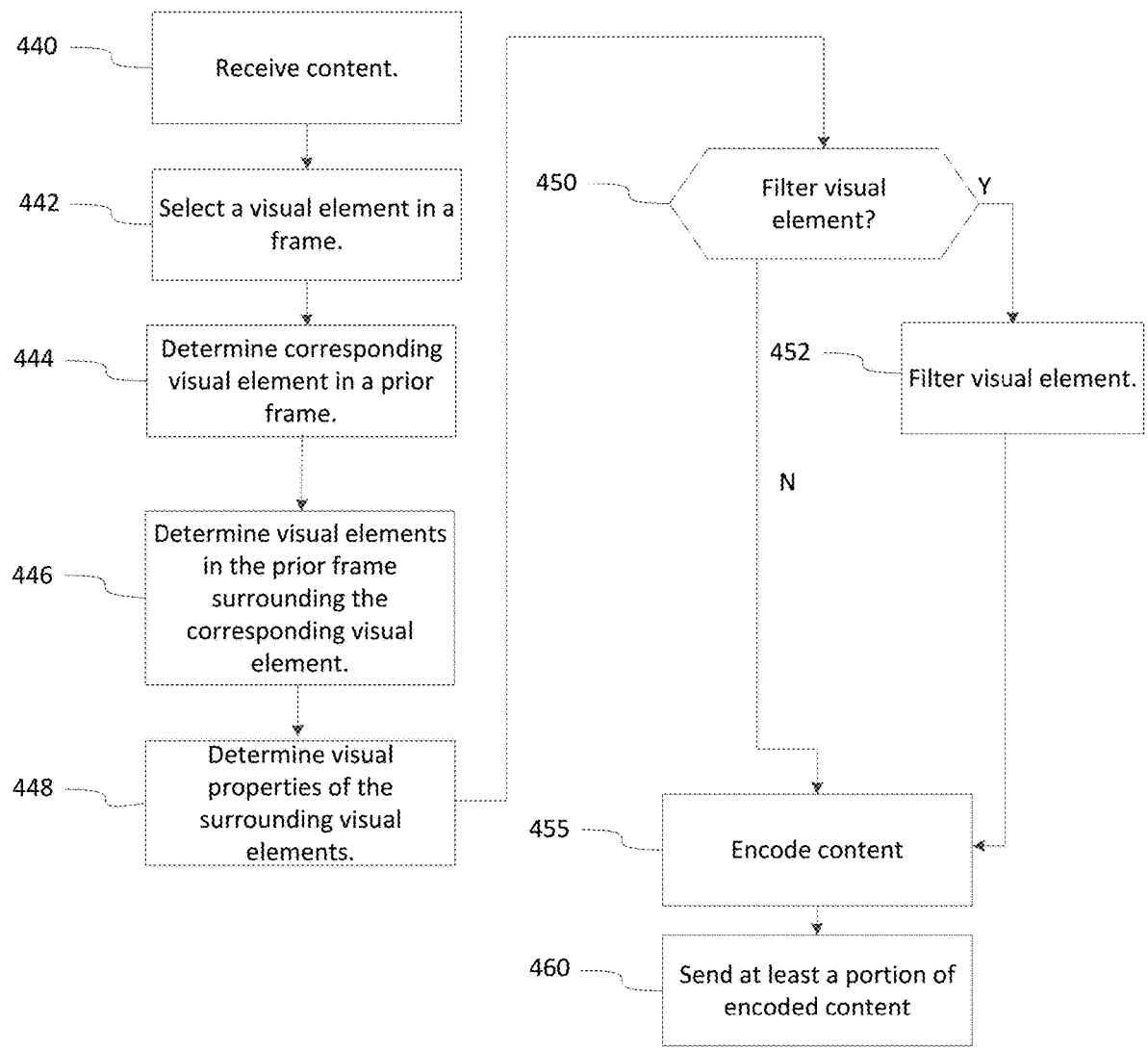
FIG. 4A is a flow chart showing an example method for filtering one or more pixels.

A computing device, such as the content filtering server 122, may determine whether to filter one or more pixels of content, such as high dynamic range (HDR) content, before the content is encoded and sent to users. The filtering may be applied to motion-encoded video. FIG. 4A is a flow chart showing an example method for filtering one or more pixels. At step 440, the computing device may receive content. At step 442, the computing device may select a visual element (e.g., pixels) in a current frame of the content. At step 444, the computing device may determine the visual element in a prior frame of the content. At step 446, the computing device may determine surrounding visual elements in the prior frame. At step 448. The computing device, may determine one or more visual properties of those surrounding visual elements in the prior frame. At step 450, the computing device may, using visual properties of those surrounding visual elements in the prior frame, determine whether the visual element in the current frame is represented accurately. If it is determined that the visual element in the current frame is represented accurately, then at steps 455 and 460, the computing device may encode the content comprising the visual element and send at least a portion of the encoded content. If it is determined that the visual element in the current frame is not represented accurately, then at step 452, the computing device may filter the visual element by changing one or more color values of that visual element. At steps 455 and 460, the computing device may encode the content comprising the visual element and send at least a portion of the encoded content.

The content may comprise a plurality of image frames, and each image frame may comprise a plurality of pixels. For example, a video, (e.g., HDR video), may comprise a plurality of image frames in sequential order. A human visual system might be less sensitive in areas with higher brightness and, conversely, more sensitive in low-light areas. This sensitivity may manifest itself more in images with higher dynamic range. Image frames or pixels in the image frames may be converted to a different color space before the pixels are filtered. For example, pixels may be converted from a YCbCr color space to a Comission Internationale de l'Eclairage (CIE) 1976 L*u*v* color space, as will be described in further detail below. Pixel(s) may be filtered based on a variety of parameters, such as the intensity level and/or complexity level of a region of pixels surrounding the pixel(s) to be filtered. Pixels may also or alternatively be filtered based on a bit rate, resolution, and/or frame rate for an encoder used to encode the filtered content. Pixels may also or alternatively be filtered based on co-located or motion compensated pixels from a prior image frame. For example, in the motion-compensated case, a motion vector may indicate movement of a pixel in a current image frame relative to a pixel in a prior image frame. The prior pixel may be determined based on the motion vector, and one or more filter weights may be used to determine a filtered pixel (e.g., based on the prior pixel and/or the current pixel).

Filtering pixels may help remove noise from video sequences, which may be introduced by cameras or other devices. Cameras, such as video cameras, may introduce noise into images after the images are captured by the camera. Noise introduced into images may cause the color of certain pixels in one frame to be erroneously represented as a slightly different color in a subsequent frame. For example, the color of a pixel used to show a portion of blue sky in a first frame might be represented as a slightly different blue color in a second frame, even though in actuality the original blue sky color should not have changed. As will be described below, the slightly different blue sky color pixel may be filtered based on a determination of whether the difference in color is correct and should be represented. This filtering may comprise examining the colors of nearby pixels, and may also be based on a determination of whether the slightly different color is noticeable to the human eye. The filtering may comprise adjusting a pixel's color. For example, the color of pixels in a current frame may be adjusted to more closely match (or equal) the color of corresponding pixels in a prior frame if it is determined that the difference in color was due to noise and/or if the difference in color is imperceptible to the human eye.

Figure 4B:
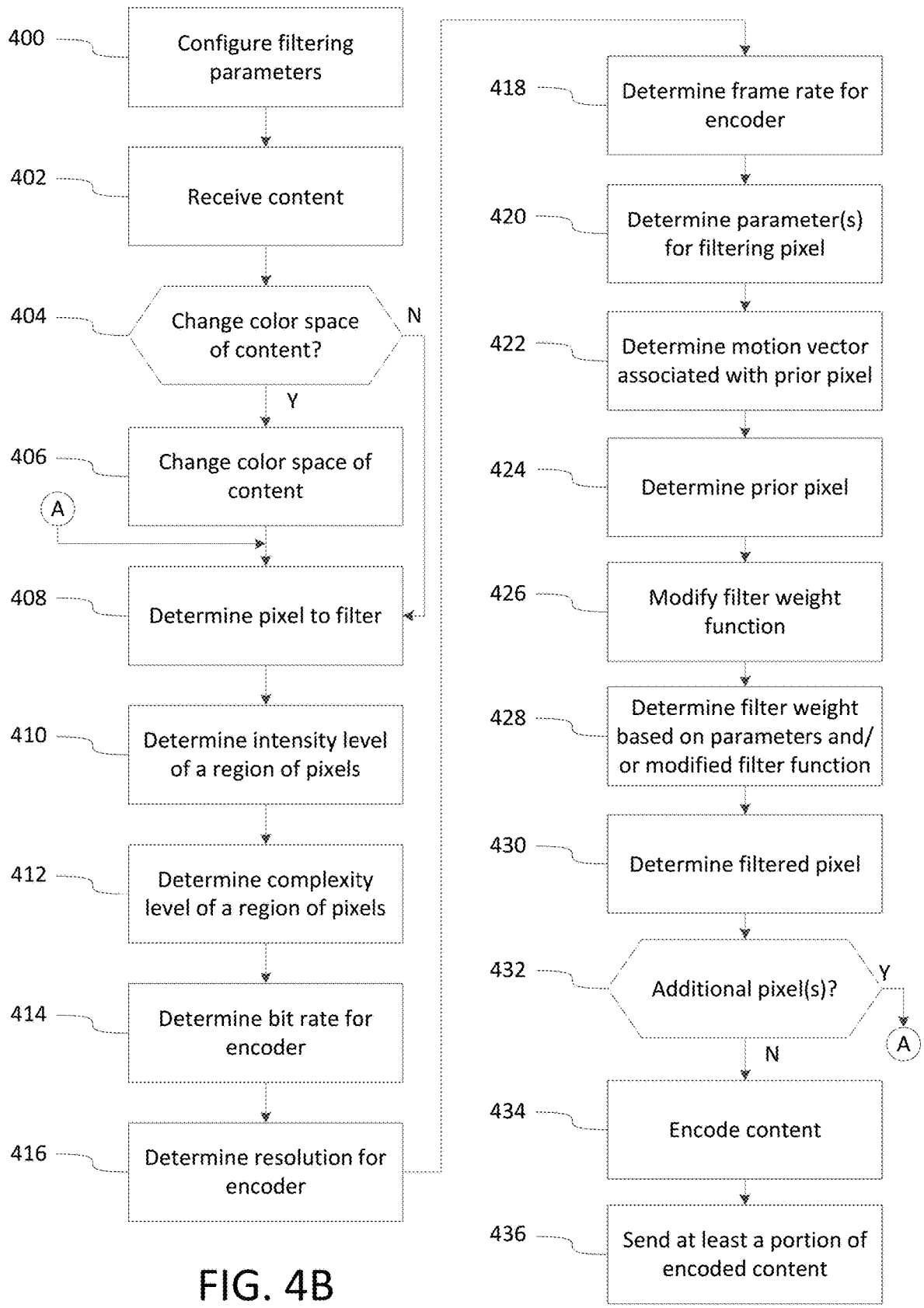
FIG. 4B is a flow chart showing an example method for determining one or more parameters for filtering pixels.

Filtering pixels may also increase compressibility of the content. The encoder used to encode the content may store the difference between an area in the current frame and a corresponding (e.g., motion-compensated) area in a prior frame. By making an area in the current frame and a corresponding area of the prior frame more similar, the amount of difference between the current frame and prior frame to be encoded may be reduced. In the blue sky example above, some of the pixels representing blue sky may vary in a way that might be nearly imperceptible. Reducing the pixel value variation in the portion of blue sky may decrease the amount of information used to encode the image. Due to this decrease, bits that would have been spent on encoding the variation (e.g., an imperceptible variation) may be spent on higher-quality encoding of the filtered images. By filtering pixels before compressing an image, compressibility of the image may be increased, which in turn may increase perceptual quality at lower bit rates. FIG. 4B is a flow chart showing an example method for determining one or more parameters for filtering pixels. Other example methods may comprise performing one or more steps of the example method in FIG. 4B in different combinations. One or more computing devices may perform one or more of the steps shown in FIG. 4B. The computing device may be located at the local office 103. For example, the computing device may be the content filtering server 122 shown in FIG. 1. Also or alternatively, the computing device may be located at a different location, such as a location within the external network 109. Steps for determining parameters for filtering pixels, applying the parameters, and/or encoding the content, as will be described in further detail below, may be performed by one or more computing devices at the local office 103, at a location within the external network 109, or at another location. After content has been filtered and/or compressed, the resulting content may be encoded and sent to one or more devices, such as devices in the premises 102a (e.g., display devices 112, additional STBs or DVRs 113, personal computers 114, laptop computers 115, wireless devices 116, landline phones 117, etc.) or other devices, such as mobile devices 125.

Content may be filtered and/or encoded if a user chooses to access the content, such as by attempting to download the content on demand. Content may also be filtered and/or encoded without a user request for the content. For example, live content may be filtered and/or encoded content before sending to multiple users. In some implementations, the filtering may include spatiotemporal pixel adjustment for high dynamic range (HDR) content. The spatiotemporal pixel adjustment may be achieved in a linear and perceptually quantized color space. In step 400, the computing device may configure one or more parameters for filtering. This configuration may be based on any combination of, for example, user input, properties of a scene being depicted, frame, and/or some local spatial or temporal area containing the pixel (e.g., texture, motion, intensity, etc.). Configuration parameters may also be learned using machine learning techniques. Additionally, or alternatively, filtering strength may depend on viewing environment properties, such as expected degree of visual angle, display properties such as brightness, ambient lighting, etc.

In step 402, the computing device may receive content. The computing device may receive the content from the content server 106 or from another content source. The computing device may also receive content from a device that captures or creates content. As explained above, the content may comprise a plurality of image frames. Each image frame of the content may comprise a plurality of pixels, and the image frames may be ordered to form a sequence of image frames. For example, the content may comprise HDR video comprising a plurality of HDR image frames.

In step 404, the computing device may determine whether to change a color space of the received content. A color space refers to a specific organization of colors. Different color spaces may have different levels of perceptual uniformity, as will be explained below, and it may be beneficial to change the color space of a content item from a first color space having lower perceptual uniformity to a second color space having higher perceptual uniformity. For example, the computing device may change the color space of a plurality of image frames of the content, one image frame, a portion of an image frame (e.g., a plurality of pixels in the image frame), portions of a plurality of image frames, etc.

A color model may include mathematical model that may represent colors as tuples of numbers. Examples include three or four values and/or color components, such as the common example of RGB color model. When a particular color model is associated with a more precise description of how the components may be interpreted, for example based on human perception of color and/or human perception of various viewing conditions, the resulting set of colors may be referred to as a color space. A color model may include, as an example, a method for describing a color. A color space may include a set of colors that may be displayed and/or reproduced in any suitable medium, for example, a stored, printed, and/or displayed medium. Mixtures of light of primary colors, such as red, blue, and green may be arranged to cover a large portion of the human color space and thus may be adapted to generate a large part of human color experiences. This is why color television or color computer monitors typically produce mixtures of red, green and/or blue light. Of course, other color spaces and color models may be utilized without departing from the teachings herein.

Figure 5A:
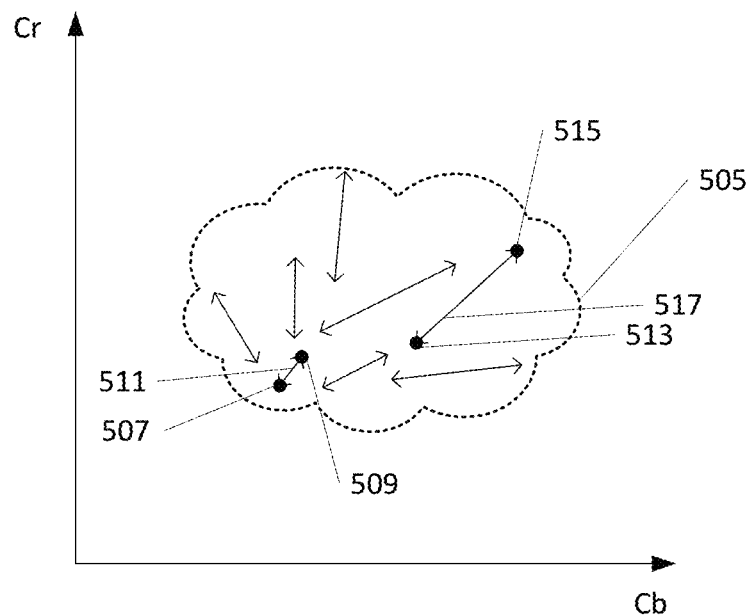
FIGS. 5A-B show examples of different color spaces.
Figure 5B:
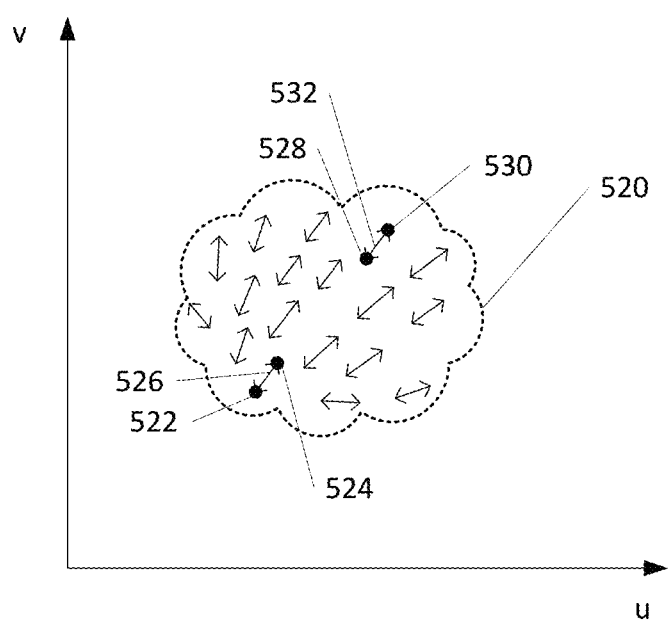

FIGS. 5A-B show examples of color representations within different color spaces. Portions of color spaces may be used to represent ranges of colors that pixels in an image frame can take. Examples of color spaces include Comission Internationale de l'Eclairage (CIE) color spaces (e.g., CIE 1931, CIELUV, CIELAB, etc.), Red, Green, Blue (RGB) based color spaces (e.g., RGB, standard RGB, ADOBE RGB, etc.), YCbCr color spaces, ICtCp, etc. FIG. 5A shows a portion 505 of color representations within a first color space (e.g., a YCbCr color space). The YCbCr color space may be used to represent, for example, digital component video. In the YCbCr color space, a luma component (e.g., Y) may represent a brightness level in the image. The chroma components (e.g., Cb and Cr) may represent color information for the image. For example, Cb (blue-difference chroma component) may indicate blue minus luma (e.g., B−Y), and Cr (red-difference chroma component) may represent red minus luma (e.g., R−Y). Different colors in the YCbCr color space may have different (Cb, Cr) coordinates in the YCbCr color space shown in FIG. 5A.

FIG. 5B shows a portion 520 of color representations within a second color space (e.g., CIE L*u*v* color space, such as the Comission Internationale de l'Eclairage (CIE) 1976 L*u*v* color space). In the CIE L*u*v* color space, the L* component may represent lightness (e.g., on a scale of 0-100). The u* component may comprise a chromaticity coordinate of a specified white object (e.g., a value of ±100). The v* component may comprise a chromaticity coordinate of the specified white object (e.g., value of ±100). Different colors in the CIE 1976 L*u*v* color space may have different (u, v) coordinates in the CIE 1976 L*u*v* color space shown in FIG. 5B.

As will be described in further detail below, one or more pixels may be converted from one color space to another. For example, assume YCbCr values of (42, 42, 42) for a pixel in the YCbCr color space. The corresponding L*u*v* values may be (56.72, 10.51, 17.33) in the CIE 1976 L*u*v*. One or more lookup tables for converting between color spaces may be used. The lookup tables may comprise pre-calculated values between color spaces. For example, a lookup table may map the above values in a YCbCr color space (e.g., 42, 42, 42) to corresponding values in the L*u*v* color space (e.g., 56.72, 10.51, 17.33). Other YCbCr values may similarly be mapped to corresponding L*u*v* values. Other examples of converting between color spaces, such as between YCbCr and L*u*v*, are described in International Telecommunication Union Radiocommunication Sector (ITU-R) BT.301, BT.709, BT.2020, and BT.2100 and International Organization for Standardization (ISO)/CIE 11664.

Different color spaces may have different levels of perceptual uniformity. The human eye may be more sensitive to some colors than other colors. For example, two colors may be considered noticeably different if the human eye can perceive them as different. Two colors may be considered "just noticeably different" if, for example, they are perceived as different only 50% of the time (e.g., by 50% of a random sampling of people). The just noticeable differences between two pairs of colors in a color space may be more uniform or less uniform. In a more perceptually uniform color space, the difference between any two colors may be of equal or similar distances. For example, the difference between two colors may correspond (e.g., be proportional) to a Euclidian distance between the two colors. In a less perceptually uniform color space, the difference between any two colors may be of different distances. A distance metric, such as Comission Internationale de l'Eclairage (CIE) delta empfindung (deltaE) (e.g., CIE deltaE 2000), may represent the difference between two colors in a color space. In a more perceptually uniform color space, the distance metric for a just noticeable difference (JND) may be relatively uniform. The computing device may determine to change the color space of the content to a second color space if the second color space has a higher level of perceptual uniformity than the first color space or if the perceptual uniformity of the second color space is higher than the perceptual uniformity of the first color space by a threshold amount.

The received content (e.g., content received in step 402) may be represented in a first color space, which may be changed to be represented in a second color space. For example, content that is represented in a first color space may be transformed to a second color space if the first color space has a lower level of perceptual uniformity than the second color space. For example, the first color space may comprise the YCbCr color space. Referring to FIG. 5A, a color 507 may be represented by coordinates $Cb_{507}$, $Cr_{507}$, and a color 509 may be represented by coordinates $Cb_{509}$, $Cr_{509}$. The difference between the color 507 and the color 509 may be imperceptible to the human eye and thus, not noticeable to a human viewer. However, the difference between the color 507 and the color 509 may be perceptible to the human eye and thus, just noticeable to a human viewer. The length of a vector 511 between the color 507 and the color 509 may represent the just noticeable difference (JND) between the color 507 and the color 509. Similarly, a color 513 may be represented by coordinates $Cb_{513}$, $Cr_{513}$, and a color 515 may be represented by coordinates $Cb_{515}$, $Cr_{515}$. The difference between the color 513 and the color 515 may be imperceptible or just noticeable to a human viewer. The length of a vector 517 between the color 513 and the color 515 may represent the just noticeable difference between the color 513 and the color 515. Due to the makeup of the human eye, the length of the vector (e.g., minimal difference in color that is needed for a person to notice the difference) may be different in different regions of the color space. For example, the human eye may be more sensitive to color differences between colors in low-light or darker areas, and less sensitive to color differences between colors in areas of higher brightness. As another example, the human eye may be less sensitive to differences between colors in areas of fast motion than in static areas. Additionally, this sensitivity to color differences may manifest itself more in images with higher dynamic range. A first color space may be more or less perceptually uniform than a second color space. In a more perceptually uniform color space, the just noticeable difference between any two colors may be equal or similar in different regions of the color space. The just noticeable difference between two colors may correspond (e.g., be proportional) to a Euclidian distance between the coordinates of the two colors within the coordinate system of that color space. In a less perceptually uniform color space, the just noticeable differences between any two colors may vary more in different regions of the color space. As shown in FIG. 5A, the length of the vector 517 corresponding to the just noticeable difference between the colors 507 and 509 in the Cb, Cr coordinate system may differ significantly from the length of the vector 511 corresponding to the just noticeable difference between the colors 513 and 515 in the Cb, Cr coordinate system. Similarly, the lengths of other vectors representing the just noticeable difference between two colors in the YCbCr may be less uniform than other color spaces, such as the L*u*v color space, which may indicate that the YCbCr color space is less perceptually uniform than other color spaces, such as the L*u*v* color space. Pixels from an image represented in the YCbCr color space may be changed so that they are represented in a different color space with more perceptual uniformity than the YCbCr color space.

A second color space for content may have a higher level of perceptual uniformity than the first color space. For example, the second color space may comprise the L*u*v* color space, such as the CIE 1976 L*u*v* color space. The CIE 1976 L*u*v* color space may provide more perceptual uniformity than the YCbCr color space and/or more perceptual uniformity than other color spaces. As noted above, the u* component may comprise a chromaticity coordinate of a specified white object, and the v* component may comprise a chromaticity coordinate of the specified white object. In FIG. 5B, a color 522 may be represented by coordinates $u_{522}$, $v_{522}$, and a color 524 may be represented by coordinates $u_{524}$, $v_{524}$. The difference between the color 522 and the color 524 may be imperceptible or just noticeable to a human viewer. The length of a vector 526 between the color 522 and the color 524 may represent the just noticeable difference between the two colors. Similarly, a color 528 may be represented by coordinates $u_{528}$, $v_{528}$, and a color 530 may be represented by coordinates $u_{530}$, $v_{530}$. The difference between the color 528 and the color 530 may be imperceptible or just noticeable to a human viewer. The length of a vector 532 between the color 528 and the color 530 may represent the just noticeable difference between the two colors. As shown in FIG. 5B, the length of the vector 526 may be similar to the length of the vector 532 in the u, v coordinate system. Similarly, the lengths of other vectors representing the just noticeable difference between two colors in the CIE 1976 L*u*v* may be more uniform, which may indicate that the CIE 1976 L*u*v* color space is more perceptually uniform than other color spaces, such as the YCbCr color space. In addition to or instead of the L*u*v* color space, other color spaces with higher perceptual uniformity may be used. For example, the CIE L*a*b* color space may be used in some scenarios.

The received content (e.g., content received in step 402) may be represented in a first color space, which may be changed to be represented in a second color space. For example, for a pixel represented in the YCbCr color space with YCbCr values of (42, 42, 42), the corresponding L*u*v* values for that pixel may be (56.72, 10.51, 17.33) in the CIE 1976 L*u*v* color space. One or more lookup tables for converting between color spaces may be used. The lookup tables may comprise pre-calculated values between color spaces. For example, a lookup table may map the pixel from a YCbCr color space with YCbCr values of (42, 42, 42) to corresponding values (56.72, 10.51, 17.33) in the L*u*v* color space. Other YCbCr values may similarly be mapped to corresponding L*u*v* values. Other examples of converting pixel color representations between different color spaces, such as between YCbCr and L*u*v*, are described in International Telecommunication Union Radiocommunication Sector (ITU-R) BT.301, BT.709, BT.2020, and BT.2100 and International Organization for Standardization (ISO)/CIE 11664.

Changing the color space of the content involves performing color space transformations which may involve floating point computations that may be computationally intensive for a GPU processor. Thus, the amount of time to process content for filtering may be reduced by not changing the color space in some scenarios. In step 404, if a color space having higher perceptual uniformity is unavailable, and/or if the computing device lacks the computational resources to perform a color space change, then then the color space need not be changed. If the computing device determines not to change the color space of the content (step 404: N), the computing device may proceed to step 408. If, on the other hand, the computing device determines to change the color space of the content (step 404: Y), the computing device may proceed to step 406.

In step 406, the color space of the content may be changed from a first color space to a second color space. The computing device may change the color space for at least a portion of the pixels of the content. For example, the color space for the following may be changed: pixels of a plurality of image frames of video content; pixels of an image frame of the video content; and/or pixels in a region of pixels within a particular image frame. In step 406, the color space of the content may be changed from a first color space to a second color space that is more perceptually uniform than the first color space. For example, the computing device may change the color space from a YCbCr color space to a L*u*v* color space. As will be described in further detail below, the filter may operate based on pixel differences. By changing the color space of the content to a more perceptually uniform color space, filtering speed and accuracy may be improved. For example, the significance of a difference expressed by pixel color difference in a L*u*v* color space may be the same or similar for any two colors. The significance of a given pixel difference in the YCbCr color space may differ more than in the L*u*v* color space or another color space with higher perceptual uniformity.

As discussed above, filtering pixels may help remove noise from video sequences, which may be introduced by cameras or other sources of noise. Noise introduced into images may cause the color of certain pixels to deviate from their actual color. Filtering pixels by adjusting their colors may be used to remove noise introduced by cameras or other noise sources. For example, the color of pixels in a current frame may be adjusted to more closely match the color of pixels in a prior frame if the corresponding pixels in the prior frame better represent the colors of the scene captured by the camera. Noise introduced into images may cause the color of certain pixels in one frame to be erroneously represented as a slightly different color in a subsequent frame. For example, the color of a pixel used to show a portion of blue sky in a first frame might be represented as a slightly different blue color in a second frame, even though in actuality the original blue sky color should not have changed. As will be described below, the slightly different blue sky color pixel may be filtered based on a determination of whether the difference in color is correct and should be represented. This filtering may comprise examining the colors of nearby pixels, and may also be based on a determination of whether the slightly different color is noticeable to the human eye. The filtering may comprise adjusting a pixel's color. In some implementations, the color of pixels in a current frame may be adjusted to more closely match (or equal) the color of corresponding pixels in a prior frame if it is determined that the difference in color was due to noise and/or if the difference in color is imperceptible to the human eye.

Filtering pixels may also increase compressibility of the content. The encoder used to encode the content may store the difference between an area in the current frame and a corresponding (e.g., motion-compensated) area in a prior frame. By making an area in the current frame and a corresponding area of the prior frame more similar, the amount of difference between the current frame and prior frame to be encoded may be reduced. In the blue sky example above, some of the pixels representing blue sky may vary in a way that might be nearly imperceptible. Reducing the pixel value variation in the portion of blue sky may decrease the amount of information used to encode the image. Due to this decrease, bits that would have been spent on encoding the variation (e.g., an imperceptible variation) may be spent on higher-quality encoding of the filtered images. By filtering pixels before compressing an image, compressibility of the image may be increased, which in turn may increase perceptual quality at lower bit rates.

In some implementations, the filtering may comprise spatiotemporal pixel adjustment for high dynamic range content. In some implementations, the spatiotemporal pixel adjustment may be performed in both a linear and perceptually quantized color space. A pixel p(i,x,y) ("source pixel") to be filtered may be located at coordinates (x, y) within the i-th frame of a video sequence. The previous co-located pixel p(i−1,x,y) ("reference pixel") is located at coordinates (x,y) in the prior frame i−1. In the case of temporal filtering, the color values within a color space of the filtered pixel p'(i,x,y) may be based on the color values within that color space of the current pixel p(i,x,y) and the color values in that color space of the previous co-located pixel p(i−1,x,y). The filtered pixel p'(i,x,y) may be determined according to the following equation:

$$p'(i, x, y) = p(i, x, y) \times \alpha + p(i-1, x, y) \times (1 - \alpha)$$

In the above equation, the filter weight is represented by α. Thus, the filtered pixel p'(i,x,y) may be determined by weighting the current pixel p(i,x,y) by α and weighting the previous co-located pixel by (1−α). The filtered pixel p'(i,x,y) may be determined as a weighted average of the color values of the current pixel p(i,x,y) ("source pixel") and the color values of the previous co-located pixel p(i−1,x,y) ("reference pixel"). The strength of the filtering may be adjusted using the filter weight α. A smaller value of α will result in more aggressive or stronger filtering, thereby bringing the source pixel p(i,x,y) closer to the reference pixel p(i−1,x,y) of even replacing the source pixel p(i,x,y) when α=0. Higher values of α may provide more weight to the source pixel p(i,x,y) and therefore, result in weaker filtering.

Figure 3:
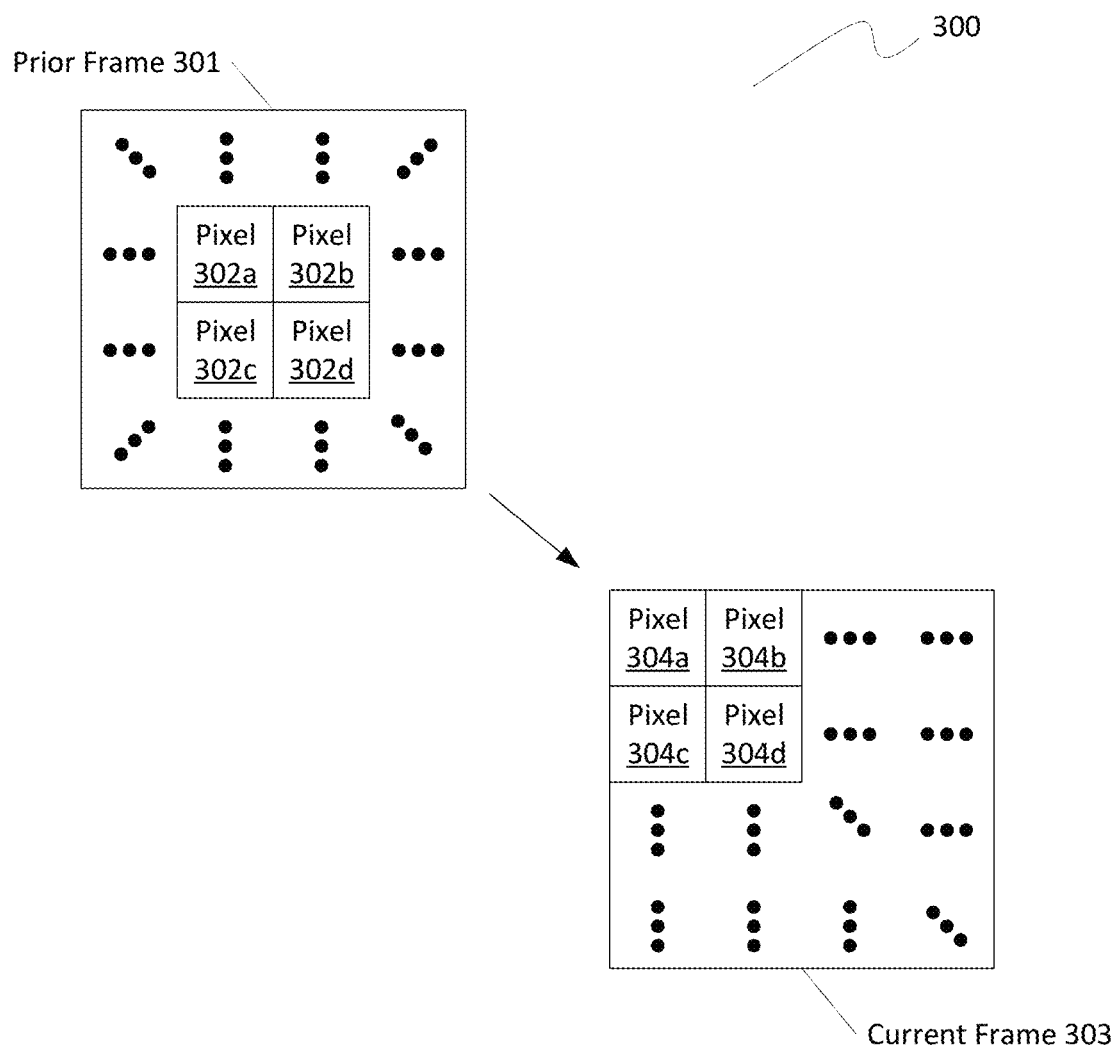
FIG. 3 shows an example of a plurality of frames of content.

In a moving video, the location a pixel in a current frame may be different relative to its location in a prior frame. FIG. 3 shows an example of a plurality of frames of content 300. For example, the content 300 may comprise a prior frame 301, and the prior frame 301 may comprise a plurality of pixels, such as a pixel 302a, a pixel 302b, a pixel 302c, a pixel 302d, and/or other pixels (not shown). The content 300 may comprise a current frame 303, and the current frame 303 may comprise a plurality of pixels, such as a pixel 304a, a pixel 304b, a pixel 304c, a pixel 304d, and/or other pixels (not shown). The content may comprise other frames (not shown), and the frames may form a video sequence. If the video sequence includes moving video, an image shown on the prior frame 301, such as on the pixel 302a, the pixel 302b, the pixel 302c, and the pixel 302d, may have moved or otherwise changed in subsequent frames. For example, for the image shown on the prior frame 301, the corresponding image on the current frame 303 may be shown on the pixel 304a, the pixel 304b, the pixel 304c, and the pixel 304d. The pixel 304a in the current frame 303 may correspond to the pixel 302a in the prior frame 301. The pixel 304b in the current frame 303 may correspond to the pixel 302b in the prior frame 301. The pixel 304c in the current frame 303 may correspond to the pixel 302c in the prior frame 301. The pixel 304d in the current frame 303 may correspond to the pixel 302d in the prior frame 301.

In the case of motion-compensated filtering, the movement of the current pixel p(i,x,y) relative to the previous co-located pixel p(i−1,x,y) may be expressed as a motion vector ($mv_x$, $mv_y$). and the filtered pixel p'(i,x,y) may be determined based on the following algorithm:

$$p'(i, x, y) = p(i, x, y) \times \alpha + p(i-1, x + mv_x, y + mv_y) \times (1 - \alpha)$$

The current pixel p(i,x,y) may be located within the current frame, for example, at coordinates (x,y). The prior co-located pixel p(i−1,x+$mv_x$,y+$mv_y$) within the prior frame i−1 may be located at, for example, coordinates (x+$mv_x$,y+$mv_y$). The strength of the filtering may be adjusted using the filter weight α. A smaller value of α will result in more aggressive filtering, thereby bringing the source pixel closer to the reference pixel. In some examples, reference pixel may replace the source pixel when α=0. Higher values of α may provide more weight to the source pixel and therefore, result in weaker filtering. Additionally, a prediction error, ε, may represent a difference between a current pixel to be filtered (e.g., a pixel in the current frame 303 shown in FIG. 3) and a prior co-located pixel (e.g., a pixel in the prior frame 301). The value of the filter weight α may be derived from the absolute difference, (|ε|), between the source and destination pixels. Thus, the filter weight α may expressed as a function of |ε|.

Figure 6:
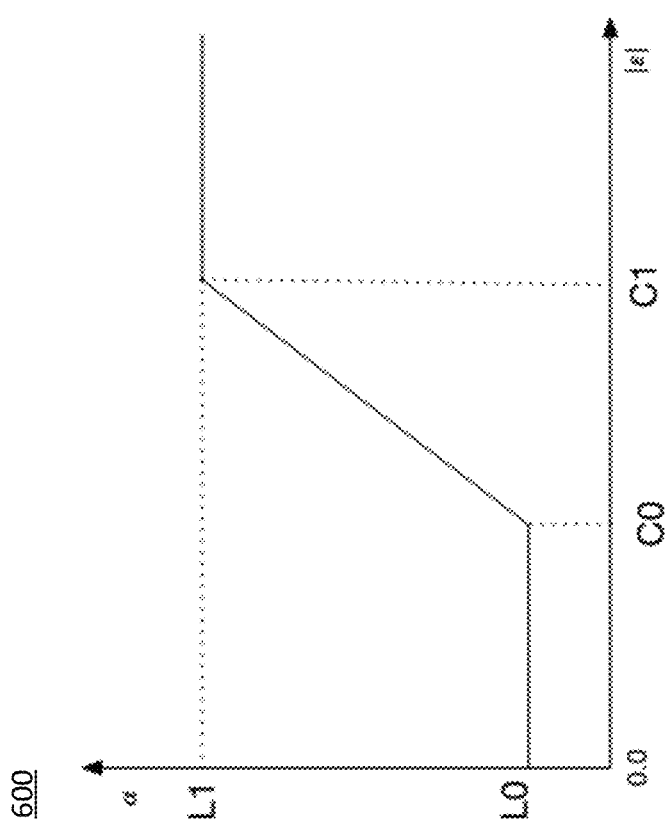
FIG. 6 shows an example of a filter weight function.

FIG. 6 shows an example graph 600 of values for the filter weight α as a function of |ε| based on the following algorithm:

$$\alpha(\varepsilon) = \begin{cases} L_0 & \forall \varepsilon: |\varepsilon| \leq L_0 \\ \frac{C_1 - C_0}{L_1 - L_0}|\varepsilon| + L_0 C_1 - L_1 C_0 & \forall \varepsilon: L_0 \leq |\varepsilon| \leq L_1 \\ L_1 & \forall \varepsilon: |\varepsilon| > L_1 \end{cases}$$

In the algorithm of the filter weight function α(ε) above, Epsilon (ε) may comprise a difference between the source and destination pixels, where |ε| may indicate the absolute difference between the source and destination pixels. The difference between the source and destination pixels may the difference in color values, as represented in a particular color space, and may be measured using metrics such as pixel difference or deltaE. The parameters $C_0$ and $C_1$ of the filter weight function α(ε) represent a magnitude of error and the parameters $L_0$ and $L_1$ are associated with an aggressiveness or strength of the filtering. Thus, the strength of the filtering may be adjusted using the filter weight α. A smaller value of α will result in more aggressive filtering, thereby bringing the source pixel color value closer to the reference pixel color value, the reference pixel color value may even replace the source pixel color value when α=0. Higher values of a may provide more weight to the source pixel color value and therefore, result in weaker filtering.

As discussed above, in the case of motion-compensated filtering, the filtered pixel p'(i,x,y) may be determined based on the following algorithm:

$$p'(i, x, y) = p(i, x, y) \times \alpha + p(i-1, x + mv_x, y + mv_y) \times (1 - \alpha)$$

As shown in FIG. 6 and discussed above, the filter weight may be expressed as a function α(ε)) may comprise a filter weight function (e.g., % weight given to source pixels vs % weight given to prediction pixels). If the absolute difference (e.g., |ε|) is less than or equal to a threshold (e.g., $L_0$), the filter weight α may be set to the threshold value (e.g., $L_0$). If the absolute difference between the source and destination pixels is greater than another threshold (e.g., $L_1$), the filter weight α may be set to the other threshold value (e.g., $L_1$). Otherwise, the filter weight α may be determined according to the function α(ε) above, and would be shown in a graph, such as graph 600 in FIG. 6, as a line connecting points ($L_0$, $C_0$) and ($L_1$, $C_1$).

The various parameters defined herein for filtering the pixel, such as $C_0$, $C_1$, $L_0$, and $L_1$, may be determined based on any number of factors such as any combination of: 1) the intensity level of a region of pixels, 2) the complexity level of a region of pixels, 3) the bit rate, 4) quantization parameters, 5) constant rate factor, 6) the resolution, and/or 7) the frame rate. The heuristics described above may be used in examples to calculate the parameters $C_0$, $C_1$, $L_0$, and/or $L_1$. For example, if the complexity level of a region of pixels is between some values x0 and x1 and bits per pixel is between y0 and y1 (e.g., bits in some time window, such as 1 second, coded picture buffer (CPB) size, and/or other pixel related parameters as discussed herein which may optionally be normalized by the number of pixels in this time period), a specific set of $C_0$, $C_1$, $L_0$, and $L_1$ parameters may be selected. The parameters $C_0$, $C_1$, $L_0$, and/or $L_1$ may also or alternatively be derived using machine learning techniques where optimal values for $C_0$, $C_1$, $L_0$, and/or $L_1$ are learned over time using experimental data gathered using known optimizations for the various parameters and hysteresis described herein. For example, more aggressive filtering or a stronger filter may be used for lower bits-per-pixel content, where the bits-per-pixel may be based on a combination of resolution, frame rate, and bit rate. Also, for example, more aggressive filtering may also be used for high intensity images. Less aggressive filtering or weaker filter may be used, for example, for higher bits-per-pixel content, where distortion introduced by stronger filtering may be more noticeable.

The parameter $C_0$ may be determined based on a just noticeable difference (JND) threshold, such as 1, 2, or another threshold. For example, for deltaE, a JND of 2 may be used. For example, the parameter $C_0$ may be set to be equal to the JND threshold or the parameter $C_0$ may be set to be proportional to the JND threshold.

Referring back to FIG. 6, the filter weight α may be expressed as a function of |ε| based on the following algorithm:

$$\alpha(\varepsilon) = \begin{cases} L_0 & \forall \varepsilon: |\varepsilon| \le L_0 \\ \dfrac{C_1 - C_0}{L_1 - L_0}|\varepsilon| + L_0 C_1 - L_1 C_0 & \forall \varepsilon: L_0 \le |\varepsilon| \le L_1 \\ L_1 & \forall \varepsilon: |\varepsilon| > L_1 \end{cases}$$

ε may comprise a prediction error and may represent a difference between a current pixel to be filtered (e.g., a pixel in the current frame 303 shown in FIG. 3) and a prior co-located pixel (e.g., a pixel in the prior frame 301). Accordingly, the filter weight α may also be a function of a difference between the current pixel and the prior co-located pixel. ε may be, for example:

$$\varepsilon = P(i, x, y) - P(i-1, x+mv_x, y+mv_y)$$

In the equation for ε shown above, the current pixel P(i,x,y) may be located at coordinates (x,y) within frame i of a video sequence. The prior co-located pixel (e.g., in frame i−1) may be represented by P(i−1,x+mv$_x$,y+mv$_y$).

The received content (e.g., content received in step 402) may be represented in a first color space, which may be changed to be represented in a second color space. For example, content that is represented in a first color space may be transformed to a second color space if the first color space has a lower level of perceptual uniformity than the second color space. The second color space may provide more perceptual uniformity than the first color space. Thus, pixels, such as the current pixel P(i,x,y) and prior co-located pixel P(i−1,x+mv$_x$,y+mv$_y$), may be converted from a first color space, such as the YCbCr color space, into a second color space, such as the CIE 1976 L*u*v* color space. DeltaE is a metric for measuring how a color difference is perceived by the human eye. Generally, the deltaE value may range from 0 to 100. As a general guide, deltaE less than or equal to 1.0 may indicate that the difference in color is not perceptible to human eyes. DeltaE values in the range of 1.0 to 2.0 may be indicative of a color difference that may be perceptible through close observation. DeltaE values in the range of 2.0 through 10.0 may be indicative of a color difference that may be perceptible to the human eye at a glance. DeltaE values in the range of 11.0 through 49.0 may be indicate that the colors are more similar than opposite. A deltaE value of 100 may indicate that the colors are exact opposite. In some implementations, the perceived difference in color between pixels may be quantified by the CIE deltaE 2000 color difference algorithm. The CIE 1976 L*u*v* color space provides more perceptual uniformity than the YCbCr color space.

A distance metric between the two pixels may be used to determine ε in the above algorithm for filter weight α. For example, the CIE deltaE 2000 function may be used in more uniform color spaces, such as the CIE 1976 L*u*v* color space. The CIE deltaE 2000 may provide a perceptually uniform distance between two points in the CIE 1976 L*u*v* color space. If the pixels are converted to the CIE 1976 L*u*v* color space and the CIE deltaE 2000 function is applied to the converted pixels, ε may be determined using the following algorithm:

$$\varepsilon = deltaE2000(P_{L^*u^*v^*}(i, x, y) - P_{L^*u^*v^*}(i-1, x+mv_x, y+mv_y))$$

In this example, ε may be represented by a difference function (e.g., a difference between source and prediction in deltaE units). For example, the difference between pixels may be calculated based on the deltaE2000 formula. While pixel values in the formula above are expressed in the L*u*v* color space, other color spaces may be used, as previously explained. To determine ε, the distance in a color space between each of the color components of the two pixels may be considered. For the CIE 1976 L*u*v* color space, for example, the distance between the L*, the u*, and the v* components of each of the pixels may be considered. Alternatively, the distance between a subset of the color components of the two pixels may be considered. For example, the distance between the L* components of each of the pixels may be considered, and P$_{L^*u^*v^*}$(i,x,y) may be replaced by P$_{L^*}$(i,x,y) and P$_{L^*u^*v^*}$(i−1,x+mv$_x$,y+mv$_y$) may be replaced by P$_{L^*}$(i−1,x+mv$_x$,y+mv$_y$). Alternatively, or also, a similar computation may be performed for the u* components and/or the v* components.

Computational complexity of color space transformations and floating point color difference computations may be non-trivial on a general purpose CPU. In some implementations, the color space of the content may not be changed from a first color space, such as the YCbCr color space, into a second color space, such as the CIE 1976 L*u*v* color space, prior to determining the parameter(s) for filtering the pixel. A simpler approximation may use the YCbCr color space and a perceptually-based quantizer (PQ) Electro-Optical Transfer Function (EOTF). The PQ EOFT may be as specified in SMPTE 2086. The filter strength, which may be determined based on parameters C$_0$, C$_1$, L$_0$, L$_1$, and/or α, may also take into account the intensity of the currently examined block of pixels, as well as overall intensity of the larger spatial area surrounding it. For example, and with reference to FIG. 6, in some implementations, the cutoff values C$_0$ and L$_0$ may be higher, and C$_1$ and L$_1$ may be lower. In some implementations, a lookup table may be used to determine the parameters C$_0$, C$_1$, L$_0$, and/or L$_1$. The lookup table may map different pixel difference ranges to the values of parameters C$_0$, C$_1$, L$_0$, and/or L$_1$. An example of a look-up table is provided in International Organization for Standardization (ISO)/International Electrotechnical Commission (IEC) 23008-14, where the quantization step may depend on intensity.

A looping process may be used to filter each pixel in a current frame. In step 408, a next pixel to filter may be determined. For example, and with reference to FIG. 3, the computing device may determine to filter the pixel 304d in the current frame 303. If the color space of the content is changed to a new or different color space (e.g., in step 406), the pixel selected for filtering in the current frame 303 may be represented in the new color space. For example, in step 402, when the content is received, the pixel 304d may be represented in a first color space (e.g. a YCbCr color space). However, if the color space of the content is changed to a second color space (e.g. a L*u*v color space), then the pixel 304d will be represented in the second color space. Additional pixels in the image frame and/or pixels in other frames may also be filtered before encoding the content. For example, one or more of the following steps may be performed for other pixels in the current frame or other frames, as will be described in further detail below (e.g., with reference to step 432).

In step 410, an intensity level of a region of pixels of the content, such as a region of pixels in an image frame having the pixel to be filtered, may be determined. The region of pixels may be surrounding the pixel to be filtered, such as a block of pixels around the pixel to be filtered. For example, the pixels in the region of pixels may be within a certain number of pixels from the pixel to be filtered. The selected region of pixels may comprise a square region of pixels or a rectangular region of pixels. Alternatively, edge detection may be used to select the region of pixels. The computing device may detect edges based on points or lines in the content where the pixel brightness changes significantly (e.g., greater than a threshold amount of brightness). Examples of algorithms for edge detection include, for example, Canny edge detection, Deriche edge detection, differential edge detection, etc. One or more detected edges may form one or more of the boundaries of the region of pixels. Also or alternatively, objects in the content may be detected, and the region of pixels may be selected based on the detected objects, such as to include the object in the region of pixels. Larger pixel regions may also be selected. For example, if much of a scene is white-ish (e.g., a scene of mountains covered in snow), the selected region of pixels may comprise the portions of the scene that are white-ish.

The intensity level of the region of pixels may be determined based on the original color space of the content or based on the modified color space. The intensity level of the region of pixels may indicate a darkness level of the region of pixels surrounding the pixel to be filtered. A darker region of pixels may have a lower intensity level, whereas a brighter region of pixels may have a higher intensity level. For example, a darker region may have blacker pixels, and a brighter region may have whiter pixels. The intensity level of pixels may be determined based on and/or as the Y component in the YCbCr color space, the L component in the L*a*b* or L*u*v* color space, or the I component in the ICtCp color space. The computing device may determine the intensity level of the region of pixels based on the intensity level of one or more of the pixels in the region, such as a mean of the intensity level of one or more of the pixels, order statistics (e.g., percentiles) of the intensity level of one or more of the pixels, or a mode of the intensity level of one or more of the pixels.

The aggressiveness of the filtering may be based on an intensity level of a region of pixels of the content. If the intensity level for the region of pixels is lower than a threshold intensity level (e.g., a darker region of pixels), the computing device may determine to be less aggressive with filtering. For example, changes in darker pixels may be more noticeable to viewers, so the computing device may apply a less aggressive filter to regions with darker pixels. As will be described in further detail below, a filter weight $\alpha$ may be used to adjust the aggressiveness or strength of filtering, and filtering may take into account the pixel being filtered and one or more corresponding pixels in the prior frame. For a less aggressive or weaker filter, more weight may be given to the pixel in the current frame, and less weight may be given to the corresponding pixel in the prior frame. For example, the computing device may determine a larger value for a filter weight $\alpha$, as will be described in further detail below. A less aggressive or weaker filter may result in a pixel color that is more similar to the color of the pixel in the current frame than the color of the corresponding pixel in the prior frame.

On the other hand, if the intensity level for the region of pixels is higher than a threshold intensity level (e.g., a brighter region of pixels), more aggressive filtering may be used. For example, changes in lighter pixels may be less noticeable to viewers, so the computing device may apply a more aggressive or stronger filter to regions with lighter pixels. For a stronger or more aggressive filter, less weight may be given to the pixel in the current frame, and more weight may be given to the corresponding pixel in the prior frame. For example, the computing device may determine a smaller value for a filter weight $\alpha$, and the pixel in the prior frame may have more of an effect on the current pixel, as will be described in further detail below. A stronger or more aggressive filter may result in a pixel color that is more similar to the color of the pixel in the prior frame than the color of the corresponding pixel in the current frame. One or more threshold intensity levels may be used to adjust the filter weight(s). For example, if the intensity level for the region of pixels is greater than a threshold intensity level, the computing device may give less weight to the pixel in the current frame, and more weight to the corresponding pixel in the prior frame. If the intensity level for the region of pixels is less than the threshold intensity level, more weight may be given to the pixel in the current frame, and less weight may be given to the corresponding pixel in the prior frame. In some examples, a lookup table indicating different adjustments for different intensity values may be used to determine the value of the filter weight $\alpha$.

In step 412, a complexity level of a region of pixels may be determined. As explained above, the region of pixels may surround the pixel to be filtered, such as a block of pixels around the pixel to be filtered. The region of pixels for which the complexity level is determined may be the same as the region of pixels for which the intensity level is determined (e.g., in step 410). Alternatively, a different region of pixels may be used. For example, if the content displays a more complex scene, overall filtering for the content may be weakened by using a different region of pixels for intensity and complexity calculations. The complexity level of a region of pixels may indicate an amount of color uniformity of the region of pixels, e.g., how sharply a pixel's color differs from neighboring pixels' colors. For example, an image of a region of sky may have similar shades of light blue and white and may be less complex or more uniform. A portion of an image showing a crowd of human faces, on the other hand, may be more complex or less uniform because of the large number of individual faces. The presence of texture or edges in a portion of an image may increase the complexity level for that portion of image. In some examples, variance between pixel colors may be used to determine the complexity of a region of pixels.

Portions of HDR images may have higher complexity than corresponding portions of non-HDR images. For example, pixels in an HDR image may adopt a wider range of colors and/or a wider range of luminance than pixels in a non-HDR image. The complexity of a block of pixels may be derived, for example, from a variance function of the block of pixels and/or an autocorrelation function of the block of pixels. For example, the computing device may calculate the variance of a region of pixels. The variance function and/or autocorrelation function may be computed on pixels in the original color space of the content (e.g., raw pixels from the source) or on pixels in the modified color space.

The complexity level of the pixel region may be used to determine a strength of the filtering. With less aggressive or weaker filtering, more weight may be given to the color value of the pixel in the current frame, and less weight may be given to the color value of the corresponding pixel in the prior frame. With more aggressive or stronger filtering, less weight may be given to the color value of the pixel in the current frame, and more weight may be given to the color value of the corresponding pixel in the prior frame. If the complexity level for the region of pixels is lower (e.g., a more uniform region of pixels), the computing device may determine to be more aggressive with filtering and therefore, less weight may be given to the color values of the pixel in the current frame, and more weight may be given to the corresponding pixel in the prior frame. On the other hand, if the complexity level for the region of pixels is higher (e.g., a less uniform region of pixels), the computing device may determine to be less aggressive with filtering and therefore, more weight may be given to the pixel in the current frame, and less weight may be given to the corresponding pixel in the prior frame. One or more threshold complexity levels may be used to adjust the filter weight(s). For example, if the complexity level for the region of pixels is greater than a threshold complexity level, more weight may be given to the pixel in the current frame, and less weight may be given to the corresponding pixel in the prior frame. If the complexity level for the region of pixels is less than the threshold complexity level, the computing device may give less weight to the pixel in the current frame, and more weight to the corresponding pixel in the prior frame. As an example, assume that the pixel difference has a value of 42 (e.g., between pixels with values of 42, such as source pixels, and 84, such as prediction pixels). Assuming that the filter weight is 50%, the computing device may determine the value of the filtered pixel to be 63 (e.g., half-way between 42 and 84). If the complexity of the region of pixels is high, the computing device may modify the weight to be, for example, 75% for the source pixel and 25% for the prediction pixel. The resulting filtered pixel value may be 53 based on the modified weights.

After one or more filters have been applied to the video content, the video content may be encoded (e.g., compressed) before transmission to one or more devices, such as devices in the premises 102a (e.g., display devices 112, additional STBs or DVRs 113, personal computers 114, laptop computers 115, wireless devices 116, landline phones 117, etc.) or other devices, such as mobile devices 125. Examples of video compression techniques that may be used include, for example, Moving Pictures Experts Group (MPEG) standards, such as ISO/IEC 13818-2 (e.g., MPEG-2 video or H.262), ISO/IEC 14496-10 Advanced Video Coding (AVC) or H.264, High Efficiency Video Coding (HEVC) H.265, Alliance for Open Media (AOM) Video 1 (AV1), or other video compression techniques. An encoder may encode the video at different bit rates, resolutions, and/or frame rates, and the computing device may also adjust filter weights based on the bit rate, resolution, and/or frame rate used by the encoder for the video content. The filter weights may be adjusted before encoding, and encoding techniques will be described in further detail below.

In step 414, a bit rate for an encoder to encode a video content, such as after one or more filters have been applied to pixels and/or frame(s) of the video content, may be determined. The bit rate for the video content may be represented in bits per unit time, such as bits per second, Megabits per second, etc. The bit rate may represent an average or maximum value. For a lower bit rate video file having a lower quality video, more aggressive filtering may be used. Cutoff ranges for different bit rates may be used. For example, if the bit rate is larger than 16 Mbit/second, the filter may be disabled and the source pixel may have a weight of 100%. If the bit rate is between 10 and 16 Mbit/second, the source pixel may have a weight of 90%, and the predicted pixel may have a weight of 10%. If the bit rate is between 7 and 10 Mbit/second, the source pixel may have a weight of 75%, and the predicted pixel may have a weight of 25%. If the bit rate is below 7 Mbit/second, the weight for the source pixel and the predicted pixel may each be set to 50%. Less weight may be given to the pixel in the current frame, and more weight may be given to the corresponding pixel in the prior frame. Lower bit rates may be used if the video content is to be encoded with more constrained bit budgets. For a higher bit rate video file having a higher quality video, the computing device may determine to use less aggressive filtering. More weight may be given to the pixel in the current frame, and less weight may be given to the corresponding pixel in the prior frame. The same or similar logic as above may be used for constant quality encoding where a constant rate factor (CRF) or quantization parameter (QP) may be supplied in lieu of or in addition to the bit rate.

In step 416, a resolution may be determined for the encoder to encode the video content. The resolution for the video content may be represented in width of the image by height of the image (e.g., represented in unit pixels). The resolution may be based on display capabilities of one or more of the devices used to display the content (e.g., display devices 112, personal computers 114, laptop computers 115, mobile devices 125, etc.). For example, some devices may be able to output content at higher resolutions, such as 4K content (e.g., 3840×2160 pixels) or 8K content (e.g., 7680× 4320), whereas other devices might not have the same capabilities (e.g., 1920×1200 pixels or 1280×720 pixels). For higher resolution video content, a stronger filter may be used because of higher pixel density per degree of visual angle where some added distortion may be imperceptible. For lower resolution video content, a weaker filter may be used because more bits may be available per pixel.

In step 418, a frame rate may be determined for the encoder to encode the video content. The frame rate for the video content may be represented in frames per unit time, such as frames per second. The frame rate may be based on display capabilities of one or more of the devices used to display the content (e.g., display devices 112, personal computers 114, laptop computers 115, mobile devices 125, etc.). For example, some devices may be able to output content at higher frame rates, such as 60 frames per second or 100 frames per second, whereas other devices might not have the same frame rate capabilities (e.g., up to 24 frames per second). For higher frame rate video content, a stronger filter may be used because fewer bits may be available per pixel compared to lower frame rate video content having the same or similar bit rate. For lower frame rate video content, a weaker filter may be used because more bits may be available per pixel.

In step 420, the parameter(s) for filtering the pixel may be determined.

A computing device may determine the parameter(s) for filtering the pixel based on one or more of the intensity level of a region of pixels, the complexity of a region of pixels, the bit rate, the resolution, and/or the frame rate. The parameters for filtering the pixel may comprise one or more parameters associated with a magnitude of error (e.g., $C_0$ and $C_1$) and one or more parameters associated with an aggressiveness of filtering (e.g., $L_0$ and $L_1$). The computing device may use the parameter(s) for filtering the pixel to determine one or more filter weights for the pixel, such as the filter weight $\alpha$. The strength of the filter may be adjusted using the filter weight $\alpha$. For example, the filter weight $\alpha$ may be determined using the following algorithm:

$$\alpha(\varepsilon) = \begin{cases} L_0 & \forall \varepsilon: |\varepsilon| \leq L_0 \\ \frac{C_1 - C_0}{L_1 - L_0}|\varepsilon| + L_0 C_1 - L_1 C_0 & \forall \varepsilon: L_0 \leq |\varepsilon| \leq L_1 \\ L_1 & \forall \varepsilon: |\varepsilon| > L_1 \end{cases}$$

In the algorithm above, Epsilon (ε) may comprise a difference between the source and destination pixels, where |ε| may indicate the absolute difference between the source and destination pixels. The difference between the source and destination pixels may the difference in color values and may be measured using metrics such as pixel difference or deltaE, and may be represented in some color space. Alpha (α(ε)) may comprise a filter weight function (e.g., % weight given to source pixels vs % weight given to prediction pixels). If the absolute difference (e.g., |ε|) is less than or equal to a threshold (e.g., $L_0$), the filter weight α may be set to the threshold value (e.g., $L_0$). If the absolute difference between the source and destination pixels is greater than another threshold (e.g., $L_1$), the filter weight α may be set to the other threshold value (e.g., $L_1$). Otherwise, the filter weight α may be determined according to the function α(ε) above, and would be shown in a graph, such as graph 600 in FIG. 6, as a line connecting points ($L_0$, $C_0$) and ($L_1$, $C_1$). FIG. 6, as will be described in further detail below, shows an example graph 600 of values for the filter weight α as a function of |ε| based on the above algorithm.

As explained above, the parameters for filtering the pixel, such as $C_0$, $C_1$, $L_0$, and $L_1$, may be determined based on one or more of the intensity level of a region of pixels, the complexity level of a region of pixels, the bit rate, quantization parameters, or constant rate factor, the resolution, and/or the frame rate. Heuristics may be used to calculate the parameters $C_0$, $C_1$, $L_0$, and $L_1$. For example, if the complexity level of a region of pixels is between some values x0 and x1 and bits per pixel is between y0 and y1 (e.g., bits in some time window, such as 1 second, coded picture buffer (CPB) size, etc., normalized by the number of pixels in this time period), then a specific set of $C_0$, $C_1$, $L_0$, and $L_1$ parameters may be selected. The parameters $C_0$, $C_1$, $L_0$, and/or $L_1$ may also or alternatively be derived using machine learning techniques. More aggressive filtering or a stronger filter may be used for lower bits-per-pixel content, where the bits-per-pixel may be based on a combination of resolution, frame rate, and bit rate. More aggressive filtering may also be used for high intensity images. Less aggressive filtering or weaker filter may be used for higher bits-per-pixel content, where distortion introduced by stronger filtering may be more noticeable.

The parameter $C_0$ may be determined based on a just noticeable difference (JND) threshold, such as 1, 2, or another threshold. For example, for deltaE, a JND of 2 may be used. For example, the computing device may set the parameter $C_0$ equal to the JND threshold or may set the parameter $C_0$ proportional to the JND threshold.

As previously explained, one or more of the parameters for filtering the pixel, such as $C_0$, $C_1$, $L_0$, and $L_1$ may be adjusted based on the bit rate, resolution, and/or frame rate for the encoder to encode the video content. For example, the computing device may adjust one or more of the parameters $C_0$, $C_1$, $L_0$, and $L_1$ so that the filter weight α results in more aggressive filtering for a lower bit rate video file and less aggressive filtering for a higher bit rate video file. The computing device may adjust one or more of the parameters $C_0$, $C_1$, $L_0$, and $L_1$ so that the filter weight α results in more aggressive filtering for a lower resolution video file and less aggressive filtering for a higher resolution video file. The computing device may adjust one or more of the parameters $C_0$, $C_1$, $L_0$, and $L_1$ so that the filter weight α results in more aggressive filtering for a lower frame rate video file and less aggressive filtering for a higher frame rate video file.

FIG. 6 shows an example graph 600 of values for the filter weight α as a function of |ε| based on the above algorithm. ε may comprise a prediction error and may represent a difference between a current pixel to be filtered (e.g., a pixel in the current frame 303 shown in FIG. 3) and a prior co-located pixel (e.g., a pixel in the prior frame 301). Accordingly, the filter weight α may also be a function of a difference between the current pixel and the prior co-located pixel. ε may be, for example:

$$\varepsilon = P(i, x, y) - P(i - 1, x + mv_x, y + mv_y)$$

The current pixel may be represented by P(i,x,y). The pixel P(i,x,y) may be located at coordinates (x,y) within frame i of a video sequence. The prior co-located pixel (e.g., in frame i−1) may be represented by $P(i-1,x+mv_x,y+mv_y)$. As explained above, pixels, such as pixel P(i,x,y) and pixel $P(i-1,x+mv_x,y+mv_y)$, may be converted from one color space, such as the YCbCr color space, into a different color space, such as the CIE 1976 L*u*v* color space. A distance metric between the two pixels may be used to determine ε in the above algorithm for α. For example, the CIE deltaE 2000 function may be used in more uniform color spaces, such as the CIE 1976 L*u*v* color space. As explained above, CIE deltaE 2000 may provide a perceptually uniform distance between two points in the CIE 1976 L*u*v* color space. If the pixels are converted to the CIE 1976 L*u*v* color space and the CIE deltaE 2000 function is applied to the converted pixels, ε may be determined using the following algorithm:

$$\varepsilon = deltaE2000(P_{L^*u^*v^*}(i, x, y) - P_{L^*u^*v^*}(i - 1, x + mv_x, y + mv_y))$$

In this example, ε may be represented by a difference function (e.g., a difference between source and prediction in deltaE units). For example, the difference between pixels may be calculated based on the deltaE2000 formula. While pixel values in the formula above are expressed in the L*u*v* color space, other color spaces may be used, as previously explained. To determine ε, the computing device may consider the distance in a color space between each of the color components of the two pixels. For the CIE 1976 L*u*v* color space, for example, the computing device may consider the distance between the L*, the u*, and the v* components of each of the pixels. Alternatively, the computing device may consider the distance between a subset of the color components of the two pixels. For example, the computing device may consider the distance between the L* components of each of the pixels, and $P_{L^*u^*v^*}(i,x,y)$ may be replaced by $P_{L^*}(i,x,y)$ and $P_{L^*u^*v^*}(i-1,x+mv_x,y+mv_y)$ may be replaced by $P_{L^*}(i-1,x+mv_x,y+mv_y)$ in the above algorithm. Alternatively or also, the computing device may perform a similar computation for the u* components and/or the v* components.

As will be described in further detail below, a higher value of the filter weight α may give more weight to a current pixel (e.g., a pixel in the current frame 303 in FIG. 3) and less weight to a prior co-located pixel (e.g., a corresponding pixel in the prior frame 301 in FIG. 3). A higher value of the filter weight α may result in a weaker filter. A lower value of the filter weight α may give more weight to the prior co-located pixel and less weight to the current pixel. A lower value of the filter weight α may result in a stronger or more aggressive filter, bringing the filtered pixel closer to the prior co-located pixel.

The color space of the content might not be changed prior to determining the parameter(s) for filtering the pixel. The deltaE function may be used for pixels in the L*u*v* color space (or other color spaces with high perceptual uniformity), and thus application of the filter may be more uniform. On the other hand, extra processing resources may be used to perform color space conversions. In order to reduce use of these extra processing resources, the computing device may determine not to change the color space prior to determining the parameters for the filter. Returning to FIG. 4B, the computing device, in step 404, may determine not to change the color space of the content (step 404: N). For example, the content may be in a YCbCr color space, and the computing device may determine not to convert the content to another color space, such as the L*u*v* color space. Since converting the content to a different color space may take time and computing resources, filtering pixel(s) without converting to a different color space may save time and/or computing resources.

If the content is in the YCbCr color space, a perceptually-based quantizer (PQ) Electro-Optical Transfer Function (EOTF) may be used to determine the parameter(s) for filtering. The filter strength, which may be determined based on parameters $C_0$, $C_1$, $L_0$, $L_1$, and/or α, may also take into account the intensity of the currently examined block of pixels, as well as overall intensity of the larger spatial area surrounding it. For example and with reference to FIG. 6, the cutoff values $C_0$ and $L_0$ may be higher, and $C_1$ and $L_1$ may be lower. A lookup table may be used to determine the parameters $C_0$, $C_1$, $L_0$, and/or $L_1$. For example, the lookup table may map different pixel difference ranges to the values of parameters $C_0$, $C_1$, $L_0$, and/or $L_1$. An example of a look-up table is provided in International Organization for Standardization (ISO)/International Electrotechnical Commission (IEC) 23008-14, where quantization step may depend on intensity.

Returning to FIG. 4B, in step 422, the computing device may determine a motion vector associated with a prior pixel. In a moving video, a pixel in a prior frame may be located at a different location than the current pixel to be filtered. As previously explained, the current pixel may be represented by p(i,x,y), and the location of the current pixel within the current frame may be (x,y). The prior co-located pixel may be represented by $p(i-1, x+mv_x, y+mv_y)$, and the location of the prior co-located pixel within the prior frame may be $(x+mv_x, y+mv_y)$. $(mv_x, mv_y)$ may represent a motion vector of the current pixel relative to the prior co-located pixel, and the computing device may determine a corresponding prior pixel and/or location of the prior pixel based on the motion vector of the current pixel relative to the prior co-located pixel. In some examples, motion vectors may be derived using various techniques, such as optical flow or block matching.

In step 424, the prior pixel corresponding to the current pixel to be filtered may be determined based on the motion vector $(mv_x, mv_y)$ associated with the prior pixel. Assuming that pixel 304*d* in FIG. 3 is the current pixel that is being filtered, the computing device may determine a motion vector $(mv_x, mv_y)$ for the current pixel 304*d* located, for example, at (x,y) in the current frame 303. Based on the location of the current pixel 304*d* in the current frame 303 (e.g., its x, y coordinates) and the motion vector $(mv_x, mv_y)$, the computing device may identify pixel 302*d* in the prior frame 301 as corresponding to pixel 304*d* in the current frame 303.

Returning to FIG. 4B, in step 426, the computing device may modify a filter weight function, such as an α function. As will be described below, the α function may be applied to the current pixel and a prior co-located pixel to determine a filtered pixel. The α function for filtering the current pixel may be adjusted by modifying various parameters, such as $C_0$, $C_1$, $L_0$, and/or $L_1$ in a filter weight function. In step 428, the computing device may determine one or more filter weights for the pixel, such as based on the parameter(s) (e.g., $C_0$, $C_1$, $L_0$, and/or $L_1$) and/or the modified filter function. As previously explained, a filter weight α may be determined using the following algorithm:

$$\alpha(\varepsilon) = \begin{cases} L_0 & \forall \varepsilon: |\varepsilon| \le L_0 \\ \frac{C_1 - C_0}{L_1 - L_0}|\varepsilon| + L_0 C_1 - L_1 C_0 & \forall \varepsilon: L_0 \le |\varepsilon| \le L_1 \\ L_1 & \forall \varepsilon: |\varepsilon| > L_1 \end{cases}$$

The filter weight α may also be adjusted based on the bit rate, resolution, and/or frame rate for the encoder encoding the content. The filter weight α may also be adjusted so that the resulting filtered pixel(s) remain within boundaries of human perception. For example, the filter weight α may be adjusted based on a contrast sensitivity function. Human sensitivity to contrast in areas of fast motion may be lower than in static areas, and the α function may depend on a value (e.g., an absolute value) of the components of the motion vector (e.g., $mv_x$, $mv_y$). Accordingly, details that become imperceptible to a viewer can be filtered out, and this approach may increase compressibility of video content.

In step 430, a filtered pixel may be determined. The filtered pixel may be determined by applying the filter weight α to the current pixel and/or the prior co-located pixel. For example, the filtered pixel may be represented by p'(i,x,y). Determining the filtered pixel by applying the filter weight to the pixel and a prior co-located pixel may comprise determining the filtered pixel p'(i,x,y) based on a weighted average of the current pixel and the prior co-located pixel. For example, determining the filtered pixel p'(i,x,y) may comprise determining the filtered pixel p'(i,x,y) based on the following algorithm:

$$p'(i, x, y) = p(i, x, y) \times \alpha + p(i-1, x+mv_x, y+mv_y) \times (1-\alpha)$$

If the current pixel in the current frame did not move relative to the corresponding pixel in the prior frame, $mv_x$ and $mv_y$ may be 0, and determining the filtered pixel p'(i,x,y) may comprise determining the filtered pixel p'(i,x,y) based on the following algorithm:

$$p'(i, x, y) = p(i, x, y) \times \alpha + p(i-1, x, y) \times (1-\alpha)$$

As the filter weight α becomes larger, more weight may be given to the current pixel in the current frame (e.g., p(i,x,y)) and less weight may be given to the prior pixel in the prior frame (e.g., $p(i-1, x+mv_x, y+mv_y)$ or p(i-1,x,y)). On the other hand, as the filter weight α becomes smaller, then less weight may be given to the current pixel in the current frame (e.g., p(i,x,y)) and more weight may be given to the prior pixel in the prior frame (e.g., p(i−1,x+mv$_x$,y+mv$_y$) or p(i−1,x,y)).

After a pixel is filtered in step 430, then in step 432, a determination may be made as to whether there are additional pixel(s) to be processed for the content and/or additional filter weight(s) to be determined for the content. A filter weight α and its parameters (e.g., $C_0$, $C_1$, $L_0$, and/or $L_1$) may be determined for a particular pixel or for a block of pixels in the same frame. With reference to FIG. 3, assume that pixels 304a, 304b, 304c, and 304d form a block of pixels. A computing device may use the same filter weight α for each pixel 304a, 304b, 304c, and 304d in the block of pixels. As previously explained, boundaries for each block of pixels may be based on different shapes, such as squares (e.g., an 8×8 block of pixels) or rectangles. Also or alternatively, boundaries may be based on edge detection, object detection, etc. Alternatively, the computing device may use different filter weights for different pixels.

The same filter weight α and its parameters (e.g., $C_0$, $C_1$, $L_0$, and/or $L_1$) may be used for a particular video sequence (e.g., a sequence comprising a plurality of sequential frames), or different filter weights and corresponding parameters may be used for each frame or scene within a video sequence. The particular configuration of filter weights and corresponding parameters may be based on any combination of, for example, user input, properties of a scene being depicted, frame, and/or some local spatial or temporal area containing the pixel (e.g., texture, motion, intensity, etc.). The filter weight α and its parameters (e.g., $C_0$, $C_1$, $L_0$, and/or $L_1$) may be adjusted to stay within the boundaries of human perception and, in particular the contrast sensitivity function. For example, this adjustment may entail dependence of the filter weight function on the absolute value of the components of the motion vector, as human sensitivity in areas of fast motion is lower than in static areas. This approach may increase compressibility of the video. Additionally, or alternatively, filtering strength may depend on viewing environment properties, such as expected degree of visual angle, display properties such as brightness, ambient lighting, etc. The computing device may determine a set of parameters (e.g., $C_0$, $C_1$, $L_0$, and/or $L_1$) for different types of scenes using, for example, machine learning. For example, for scenes corresponding to anime content, milder filtering may be used because of higher motion levels and/or more rapid and/or dramatic changes in colors between scenes. Talking head scenes, on the other hand, may use heavier filtering because of the lower motion levels and/or color values that are not likely to change as quickly and as dramatically between scenes.

Returning to FIG. 4B, in step 432, if it is determined that there are additional pixel(s) to be processed and/or additional filter weight(s) to be determined (step 432: Y), the computing device may return to step 408 to determine a pixel or group of pixels to be filtered. If, on the other hand, the computing device determines that there are not additional pixel(s) to be processed and/or additional filter weight(s) to be determined (step 432: N), the computing device may proceed to step 434.

In step 434, the computing device may encode (e.g., compress) at least a portion of the content. The encoded portion may comprise the filtered pixel, the filtered block of pixels, the filtered frame, the filtered sequence of frames, and the like. The portion of content to be encoded may comprise a frame or a plurality of frames (e.g., a sequence of frames, such as in a video sequence). As previously explained, examples of video compression techniques that may be used include, for example, MPEG-2, AVC H.264, HEVC H.265, AV1, or other video compression techniques. The encoder may encode the content at different bit rates, resolutions, and/or frame rates.

In step 436, at least a portion of the encoded content may be sent to a destination. For example, the encoded content may be sent to one or more devices, such as devices in the premises 102a (e.g., display devices 112, additional STBs or DVRs 113, personal computers 114, laptop computers 115, wireless devices 116, landline phones 117, etc.) or other devices, such as mobile devices 125.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
   receiving, by a computing device, a plurality of video frames of a content item, wherein each of the video frames comprises a plurality of pixels;
   determining, for a first pixel in a frame of the content item, a prior corresponding pixel in a preceding frame of the content item;
   determining, based on a parameter associated with a pixel region in the preceding frame, whether to filter the first pixel, wherein the pixel region comprises:
   the prior corresponding pixel, and
   one or more pixels that surround the prior corresponding pixel; and
   based on a determination to filter the first pixel:
   determining, based on the parameter associated with the pixel region, one or more filtering parameters;
   filtering, based on the one or more filtering parameters, the first pixel; and
   encoding a portion of the content item that comprises the filtered first pixel.

2. The method of claim 1, wherein the parameter associated with the pixel region is an intensity level of the pixel region.

3. The method of claim 1, wherein the parameter associated with the pixel region is a complexity level of the pixel region.

4. The method of claim 1, wherein the plurality of video frames are sequential video frames.

5. The method of claim 1, wherein the parameter associated with the pixel region is an intensity level of the pixel region, wherein the intensity level of the pixel region indicates a darkness level of the one or more pixels that surround the prior corresponding pixel, and wherein the filtering comprises adjusting a color value of the first pixel based on the intensity level.

6. The method of claim 1, wherein the parameter associated with the pixel region is a complexity level of the pixel region, wherein the complexity level of the pixel region indicates an amount of color uniformity of the pixel region based on a color difference between the one or more pixels that surround the prior corresponding pixel and the prior corresponding pixel, and wherein the filtering comprises adjusting a color value of the first pixel based on the complexity level.

7. The method of claim 1, further comprising determining, based on a motion vector associated with the prior corresponding pixel, a location, in the preceding frame, of the prior corresponding pixel, wherein the location of the prior corresponding pixel in the preceding frame is different from a location, in the frame, of the first pixel.

8. The method of claim 1, wherein the one or more filtering parameters are associated with a magnitude of error and associated with a strength of the filtering.

9. The method of claim 1, wherein the filtering comprises:
determining, based on the parameter associated with the pixel region, a weighted average of a color value of the first pixel and a color value of the prior corresponding pixel; and
determining, based on the weighted average of the color value of the first pixel and the color value of the prior corresponding pixel, a strength of the filtering.

10. The method of claim 1, wherein a first color space associated with the plurality of pixels comprises a perceptually non-uniform color space, wherein the content item comprises high dynamic range (HDR) video, and wherein the filtering comprises adjustment of the first pixel based on a color value of the first pixel in a second color space that is more perceptually uniform than the first color space.

11. The method of claim 10, wherein the first color space is a YCbCr color space.

12. The method of claim 1 further comprising, prior to the filtering, converting the first pixel from a YCbCr color space to a Commission Internationale de l'Eclairage (CIE) 1976 L*u*v* color space.

13. A system comprising:
a first computing device configured to:
receive a plurality of video frames of a content item, wherein each of the video frames comprises a plurality of pixels;
determine, for a first pixel in a frame of the content item, a prior corresponding pixel in a preceding frame of the content item;
determine, based on a parameter associated with a pixel region in the preceding frame, whether to filter the first pixel, wherein the pixel region comprises:
the prior corresponding pixel, and
one or more pixels that surround the prior corresponding pixel; and
based on a determination to filter the first pixel:
determine, based on the parameter associated with the pixel region, one or more filtering parameters;
filter, based on the one or more filtering parameters, the first pixel; and
encode a portion of the content item that comprises the filtered first pixel; and
a second computing device configured to send, to the first computing device, the plurality of video frames.

14. The system of claim 13, wherein the parameter associated with the pixel region is an intensity level of the pixel region.

15. The system of claim 13, wherein the parameter associated with the pixel region is a complexity level of the pixel region.

16. The system of claim 13, wherein the plurality of video frames are sequential video frames.

17. The system of claim 13, wherein the parameter associated with the pixel region is an intensity level of the pixel region, wherein the intensity level of the pixel region indicates a darkness level of the one or more pixels that surround the prior corresponding pixel, and wherein the filtering comprises adjusting a color value of the first pixel based on the intensity level.

18. The system of claim 13, wherein the parameter associated with the pixel region is a complexity level of the pixel region, wherein the complexity level of the pixel region indicates an amount of color uniformity of the pixel region based on a color difference between the one or more pixels that surround the prior corresponding pixel and the prior corresponding pixel, and wherein the filtering comprises adjusting a color value of the first pixel based on the complexity level.

19. The system of claim 13, wherein the first computing device is further configured to determine, based on a motion vector associated with the prior corresponding pixel, a location, in the preceding frame, of the prior corresponding pixel, wherein the location of the prior corresponding pixel in the preceding frame is different from a location, in the frame, of the first pixel.

20. The system of claim 13, wherein the one or more filtering parameters are associated with a magnitude of error and associated with a strength of the filtering.

21. The system of claim 13, wherein the first computing device is configured to filter the first pixel at least by:
determining, based on the parameter associated with the pixel region, a weighted average of a color value of the first pixel and a color value of the prior corresponding pixel; and
determining, based on the weighted average of the color value of the first pixel and the color value of the prior corresponding pixel, a strength of the filtering.

22. The system of claim 13, wherein:
a first color space associated with the plurality of pixels comprises a perceptually non-uniform color space;
the content item comprises high dynamic range (HDR) video; and
the first computing device is configured to filter the first pixel at least by adjusting the first pixel based on a color value of the first pixel in a second color space that is more perceptually uniform than the first color space.

23. The system of claim 22, wherein the first color space is a YCbCr color space.

24. The system of claim 22, where the first computing device is further configured to, prior to filtering the first pixel, convert the first pixel from a YCbCr color space to a Commission Internationale de l'Eclairage (CIE) 1976 L*u*v* color space.

25. A non-transitory computer-readable medium storing instructions that, when executed, configure a computing device to:
receive a plurality of video frames of a content item, wherein each of the video frames comprises a plurality of pixels;
determine, for a first pixel in a frame of the content item, a prior corresponding pixel in a preceding frame of the content item;
determine, based on a parameter associated with a pixel region in the preceding frame, whether to filter the first pixel, wherein the pixel region comprises:
the prior corresponding pixel, and
one or more pixels that surround the prior corresponding pixel; and
based on a determination to filter the first pixel:
determine, based on the parameter associated with the pixel region, one or more filtering parameters;

filter, based on the one or more filtering parameters, the first pixel; and encode a portion of the content item that comprises the filtered first pixel.

26. The non-transitory computer-readable medium of claim 25, wherein the parameter associated with the pixel region is an intensity level of the pixel region.

27. The non-transitory computer-readable medium of claim 25, wherein the parameter associated with the pixel region is a complexity level of the pixel region.

28. The non-transitory computer-readable medium of claim 25, wherein the plurality of video frames are sequential video frames.

29. The non-transitory computer-readable medium of claim 25, wherein the parameter associated with the pixel region is an intensity level of the pixel region, wherein the intensity level of the pixel region indicates a darkness level of the one or more pixels that surround the prior corresponding pixel, and wherein the filtering comprises adjusting a color value of the first pixel based on the intensity level.

30. The non-transitory computer-readable medium of claim 25, wherein the parameter associated with the pixel region is a complexity level of the pixel region, wherein the complexity level of the pixel region indicates an amount of color uniformity of the pixel region based on a color difference between the one or more pixels that surround the prior corresponding pixel and the prior corresponding pixel, and wherein the filtering comprises adjusting a color value of the first pixel based on the complexity level.

31. The non-transitory computer-readable medium of claim 25, wherein the instructions, when executed, further configure the computing device to determine, based on a motion vector associated with the prior corresponding pixel, a location, in the preceding frame, of the prior corresponding pixel, wherein the location of the prior corresponding pixel in the preceding frame is different from a location, in the frame, of the first pixel.

32. The non-transitory computer-readable medium of claim 25, wherein the one or more filtering parameters are associated with a magnitude of error and associated with a strength of the filtering.

33. The non-transitory computer-readable medium of claim 25, wherein the instructions, when executed configure the computing device to filter the first pixel by at least:

determining, based on the parameter associated with the pixel region, a weighted average of a color value of the first pixel and a color value of the prior corresponding pixel; and determining, based on the weighted average of the color value of the first pixel and the color value of the prior corresponding pixel, a strength of the filtering.

34. The non-transitory computer-readable medium of claim 25, wherein a first color space associated with the plurality of pixels comprises a perceptually non-uniform color space, wherein the content item comprises high dynamic range (HDR) video, and wherein the filtering comprises adjustment of the first pixel based on a color value of the first pixel in a second color space that is more perceptually uniform than the first color space.

35. The non-transitory computer-readable medium of claim 34, wherein the first color space is a YCbCr color space.

36. The non-transitory computer-readable medium of claim 25, wherein the instructions, when executed, further configure the computing device to, prior to the filtering, convert the first pixel from a YCbCr color space to a Commission Internationale de l'Eclairage (CIE) 1976 L*u*v* color space.

37. A computing device comprising:
one or more processors; and
memory storing instructions that, when executed by the one or more processors, cause the computing device to:
receive a plurality of video frames of a content item, wherein each of the video frames comprises a plurality of pixels;
determine, for a first pixel in a frame of the content item, a prior corresponding pixel in a preceding frame of the content item;
determine, based on a parameter associated with a pixel region in the preceding frame, whether to filter the first pixel, wherein the pixel region comprises:
the prior corresponding pixel, and
one or more pixels that surround the prior corresponding pixel; and
based on a determination to filter the first pixel:
determine, based on the parameter associated with the pixel region, one or more filtering parameters;
filter, based on the one or more filtering parameters, the first pixel; and
encode a portion of the content item that comprises the filtered first pixel.

38. The computing device of claim 37, wherein the parameter associated with the pixel region is an intensity level of the pixel region.

39. The computing device of claim 37, wherein the parameter associated with the pixel region is a complexity level of the pixel region.

40. The computing device of claim 37, wherein the plurality of video frames are sequential video frames.

41. The computing device of claim 37, wherein the parameter associated with the pixel region is an intensity level of the pixel region, wherein the intensity level of the pixel region indicates a darkness level of the one or more pixels that surround the prior corresponding pixel, and wherein the filtering comprises adjusting a color value of the first pixel based on the intensity level.

42. The computing device of claim 37, wherein the parameter associated with the pixel region is a complexity level of the pixel region, wherein the complexity level of the pixel region indicates an amount of color uniformity of the pixel region based on a color difference between the one or more pixels that surround the prior corresponding pixel and the prior corresponding pixel, and wherein the filtering comprises adjusting a color value of the first pixel based on the complexity level.

43. The computing device of claim 37, wherein the instructions, when executed by the one or more processors, further cause the computing device to determine, based on a motion vector associated with the prior corresponding pixel, a location, in the preceding frame, of the prior corresponding pixel, wherein the location of the prior corresponding pixel in the preceding frame is different from a location, in the frame, of the first pixel.

44. The computing device of claim 37, wherein the one or more filtering parameters are associated with a magnitude of error and associated with a strength of the filtering.

45. The computing device of claim 37, wherein the instructions, when executed by the one or more processors, cause the computing device to filter the first pixel at least by:

determining, based on the parameter associated with the pixel region, a weighted average of a color value of the first pixel and a color value of the prior corresponding pixel; and determining, based on the weighted average of the color value of the first pixel and the color value of the prior corresponding pixel, a strength of the filtering.

46. The computing device of claim 37, wherein a first color space associated with the plurality of pixels comprises a perceptually non-uniform color space, wherein the content item comprises high dynamic range (HDR) video, and wherein the filtering comprises adjustment of the first pixel based on a color value of the first pixel in a second color space that is more perceptually uniform than the first color space.

47. The computing device of claim 46, wherein the first color space is a YCbCr color space.

48. The computing device of claim 37, wherein the instructions, when executed by the one or more processors, cause the computing device to, prior to filtering the first pixel, convert the first pixel from a YCbCr color space to a Commission Internationale de l'Eclairage (CIE) 1976 L*u*v* color space.

* * * * *